United States Patent [19]

Dozier et al.

[11] Patent Number: 5,202,767
[45] Date of Patent: Apr. 13, 1993

[54] MULTIMODE COMPUTERIZED MULTICOLOR CAMERA AND METHOD THEREFOR

[75] Inventors: David R. Dozier; Kendall Preston, Jr., both of Tucson, Ariz.

[73] Assignee: Pathology Imaging Corporation, Tucson, Ariz.

[21] Appl. No.: 634,323

[22] Filed: Dec. 26, 1990

[51] Int. Cl.⁵ ............................................. H04N 9/07
[52] U.S. Cl. ..................................... 358/209; 358/42
[58] Field of Search ...................... 358/468, 42–44, 358/209, 310, 312, 909; 379/100

[56] References Cited

U.S. PATENT DOCUMENTS

| | | | |
|---|---|---|---|
| 4,505,589 | 3/1985 | Ott et al. | 356/402 |
| 4,544,952 | 10/1985 | Pham van Cang | 358/51 |
| 4,709,259 | 11/1987 | Suzuki | 358/44 |
| 4,833,533 | 5/1989 | Augusti et al. | 358/80 |
| 4,835,594 | 5/1989 | Kihara | 358/50 |
| 4,859,063 | 8/1989 | Fay et al. | 358/42 |
| 5,048,101 | 9/1991 | Kurosu et al. | 358/451 |
| 5,062,136 | 10/1991 | Grattis et al. | 379/100 |
| 5,070,406 | 12/1991 | Kinoshita | 358/43 |

FOREIGN PATENT DOCUMENTS 0175385 3/1986 European Pat. Off. ............ 358/444

Primary Examiner—Edward L. Coles, Sr.
Assistant Examiner—Jill Jackson
Attorney, Agent, or Firm—Harry M. Weiss

[57] ABSTRACT

A computerized multicolor camera is disclosed that provides digital signal representations of several monocolor images of an object. The camera has an image sensor with an imaging region that develops a charge pattern in response to incident light reflected from the object through a selectable color filter to the imaging region. This analog charge pattern for each selectable color is digitized, the computer within the camera corrects the digitized values for nonlinearities of the image sensor, and stores the corrected digital values in its internal memory. The computer within the camera can then transfer the digital representations of the image to an external computer via a SCSI interface. In addition, the camera has an analog output mode that generates a monocolor real time video signal.

17 Claims, 13 Drawing Sheets

MULTIMODE COMPUTERIZED MULTICOLOR CAMERA AND METHOD THEREFOR

BACKGROUND OF THE INVENTION

1. Field of the Invention

This invention relates generally to photographic imaging and methods therefor and, more particularly, to a computerized multicolor electronic camera and method therefor comprising a computer-controlled electronic image sensor which requires less light to produce an analog image of an object than a conventional electronic camera, provides a digital signal representation of said analog image or a portion thereof that is stored in the camera, eliminates pixel jitter, and is capable of transfering said digital signal representation to a host computer using a Small Computer System Interface (SCSI). Said computerized camera furthermore provides digital correction of photometric nonlinearities in said digital representation of said analog image, provides exposure control at each of a multiplicity of colors in order to compensate for the non-uniform spectral response of said image sensor, and generates real-time monocolor video on command to assist the user in focusing.

2. Description of the Prior Art

Photographic images are an essential part of almost every aspect of diagnosis, teaching, and publication in medical fields, such as the field of pathology. When photographic images are included as reference material for teaching, for example, they are typically stored as a 35 millimeter transparencies. A pathologist in a teaching hospital, for example, may have on file as many as 100,000 transparencies. Since the transparencies themselves are not in electronic form, computerized storage and retrieval techniques are not applicable to such files.

To obtain an electronic representation of an image of a microscopic specimen, a pathologist may utilize a video camera connected to a microscope to display, on a cathode ray tube, an image of said specimen magnified through the microscope. Alternatively, to obtain an electronic representation of the image of a gross specimen, a pathologist may use a video camera mounted on a tripod with the image of said specimen produced using a standard video camera lens. It should be noted that in both cases the quality of the electronic representation of the image should be similar to that which is obtainable when a 35 millimeter camera is connected to record a photographic image of said specimen.

According to the prior art, the best electronic representation of an image of a specimen was previously generated by utilizing a studio quality video camera. As is well known to those skilled in the art, the studio camera has a notoriously low sensitivity to light. Therefore, in practice, a high illumination level is maintained. This high illumination level may bleach a microscopic specimen and thereby damage it. Further, a high illumination level can cause discomfort to the pathologist viewing the specimen.

To obtain a digital signal representation of an electronic representation of an image of a specimen the video output of a studio camera must be connected to what is known in the art as a "frame grabber" that digitizes a selected frame, thereby generating a digital signal representation of the video image. Most digital computers do not provide for the direct installation of a frame grabber but do frequently provide a SCSI (Small Computer Systems Interface) connection to external digital devices. Therefore, in practice, a frame graber-SCSI interface must be used to provide the digital signal representation of the image.

The studio camera usually operates at a 30 frame per second rate using analog voltages to generate analog horizontal and vertical timing signals that are required to scan the analog electronic image produced on the photosensitive surface within the camera and generate the analog electronic signal representation in a form suitable for display on a cathode ray tube. Analog horizontal and vertical timing signals are notoriously inaccurate so that the electronic signal representation of the image varies spatially from frame to frame. This is known in the art as "pixel jitter." If the studio camera were computerized so that the vertical and horizontal timing signals were digitally generated and therefore precise, then pixel jitter would be eliminated.

It is well known to those skilled in the art that the photosensitive surface within a studio camera exhibits photometric nonlinearities in that the analog value of the electronic signal representation of an image is not linearly proportional to the intensity of the incident light. If the studio camera were computerized, its photometric nonlinearities could be compensated by digital means.

Further, a studio camera is notoriously inaccurate in its spectral response in that the analog value of the electronic signal representation of an image varies nonlinearly as a function of the wavelength of the incident light energy. If the studio camera were computerized, its nonlinear spectral responsivity could be compensated by supplying a digitally controlled exposure for each wavelength.

As is well known to those skilled in the art, current implementations of the SCSI standard do not accomodate data transfer at a rate suitable for the transmission of real-time video data from a studio camera. Therefore, computerization of a studio camera and use of a SCSI interface would significantly slow the generation of the electronic signal representation of an image. This would make it difficult for a pathologist to focus the image. However, by providing an asynchronous operating mode for the computerized studio camera for the purpose of generating an electronic signal representation of the image on a cathode ray tube in real-time, the image could easily be focused prior to digitization. Furthermore, by permitting the pathologist to focus images corresponding to each spectral color of a full-color image separately, it would be possible to correct for the chromatic aberration of a microscope lens or video camera lens.

A studio camera is usually inconveniently large. Both the studio camera and the associated frame grabber are expensive. Computerized studio cameras not requiring frame grabbers are unavailable. Accordingly, a need exists for a small, relatively inexpensive, computerized multicolor camera that operates at any light level both to minimize damage to a specimen, the image of which is being recorded, and to reduce discomfort to the observer. Further, a need exists for such a computerized multicolor camera to be of a type that produces digital horizontal and vertical timing signals so that pixel jitter is eliminated. Also, a need exists for such a computerized multicolor camera to be of a type that provides an exposure control at each of several selected wavelengths combined in a manner to compensate for nonuniformities in the spectral response of the camera. Additionally, a need exists for such a computerized camera to be of a type that provides a digital signal representation of an image of an object via a SCSI interface to a host computer. Finally, there is a need for such a camera to produce real-time monocolor video at one or more of the selected wavelengths for focusing.

SUMMARY OF THE INVENTION

An object of the present invention is to provide a computerized multicolor camera and method therefor comprised of an internal computer controlling an image sensor that generates a digital signal representation of a multicolor image of an object in a format that is compatible with the Small Computer Systems Interface.

Another object of the present invention is to provide a computerized multicolor camera and method therefor to adjust the exposure time for each wavelength of light used in illuminating said object in a manner related to the spectral sensitivity of said image sensor at all of said wavelengths.

Another object of the present invention is to provide a computerized multicolor camera and method therefor that operates over a wide range of light levels.

Another object of the present invention is to provide a computerized multicolor camera and method therefor whose horizontal and vertical timing signals are digitally generated and synchronized to the clock frequency of said internal computer so that there is an exact frame-to-frame registration of all colors of the multicolor image of said object without pixel jitter.

Another object of the present invention is to provide a computerized multicolor camera and method therefor that generates a digital signal representation of a multicolor image of said object wherein each digital value is tabularly compensated for the photometric nonlinearities of said image sensor.

Another object of the present invention is to provide a computerized multicolor camera and method therefor which provides real-time video to permit ease in focusing the electronic signal representation of said image of said object prior to digitization, including where necessary separate focusing at each wavelength to compensate for chromatic aberrations in the lens system of the camera.

Another object of the present invention is to provide a computerized multicolor camera and method therefor which generates a digital signal representation of said image of said object in a format which allows a multiplicity of images to be stored in a file where computerized storage and retrieval techniques are applicable.

According to the present invention, the wavelength of light from an object which is incident upon an imaging region of an image sensor may be controlled by color filters. Additionally, the filtered light from an object incident upon said imaging region of said image sensor is integrated during a variably controlled exposure time related to the known spectral response of said image sensor at said wavelength. In response to the incident light, said imaging region of said image sensor develops an analog charge pattern representative of said image. Said charge pattern is comprised of unique entities known in the art as "charge packets" corresponding to each of the least resolvable elements of said image. Said least resolvable elements are known in the art as "pixels." The amount of charge associated with each pixel is known in the art as a "pixel value." Said pixel values are initially uncompensated for the photometric nonlinearity of said image sensor or for the nonlinearity of its signal amplifiers.

Said charge packets are transferred, forming an analog signal representation of the uncompensated pixel values of said image, under the control of precise horizontal and vertical timing signals generated by an internal computer thus providing an accurate determination the position in the image of each charge packet. Under this precise spatial control by the internal computer, the analog pixel values are digitized. Said digitized pixel values, provide an uncompensated digital representation of said image, are applied in sequence to the address input of a digital memory unit that stores a digital representation of a photometric compensation table. The output of said digital memory unit for each digital uncompensated pixel value is a digital representation of the compensated pixel value. Said digital compensated pixel values may be stored in the digital memory of the internal computer.

The totality of compensated pixel values, which together comprise the digital signal representation of the compensated image, may be transferred by the internal computer to a host computer through a Small Computer Systems Interface. In this manner, digital signal representations of images of an object may be generated by the camera at the three primary colors (red, green, and blue), transferred to, and combined in a host computer that may be made operable to generate and display a signal representation of a compensated, undistorted, multicolor image.

When not used to digitize said multicolor image of said object, the internal computer may also be used to release control of the timing of said image sensor to a free running asynchronous oscillator operating at a real-time video rate. This permits the camera to generate real-time video for display on a cathode ray tube so that the user may adjust focus.

Finally, because the internal computer controls the wavelength of light from the illuminated object that is incident on the image sensor and also controls the exposure time at said wavelength, a computerized multicolor camera in accordance with the invention has the advantage of requiring neither an iris nor a shutter.

The apparatus of the present invention is easily and economically operated by a host computer so as to produce on a cathode ray tube a compensated, jitter-free, multimode image in delayed time or, alternatively a real-time monocolor video image.

The foregoing objects and other objects of the present invention will be apparent from the following, more particular description of the preferred embodiment of the invention as illustrated in the accompanying drawing.

DESCRIPTION OF THE PREFERRED EMBODIMENT

Figure 1:
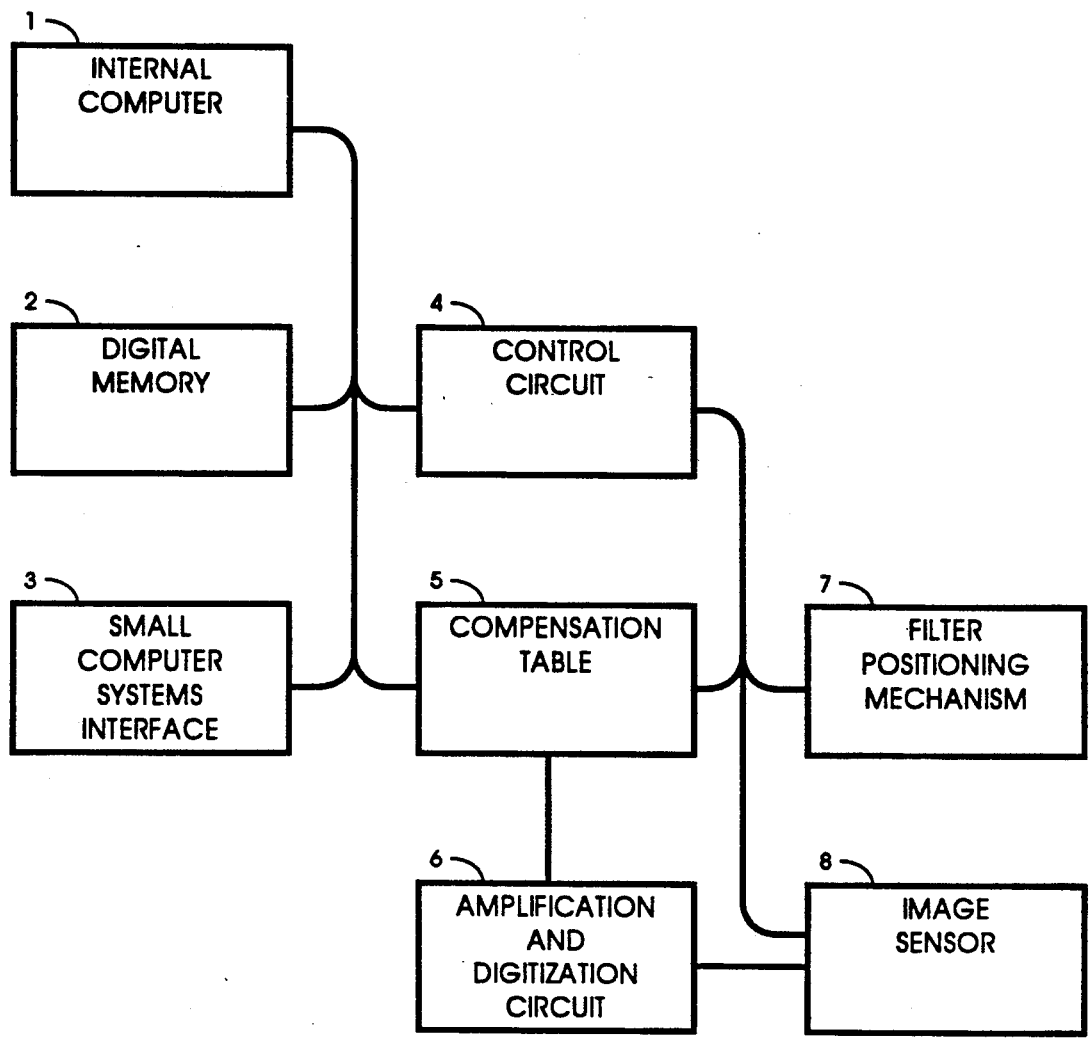
FIG. 1 is a simplified block diagram of the preferred embodiment of the present invention.

With reference to FIG. 1, an IMAGE SENSOR 8 of a multicolor camera is controlled by an INTERNAL COMPUTER 1, known in the art as a "microprocessor." In addition, the microprocessor in conjunction with a CONTROL CIRCUIT 4 sets the operational mode of the camera, allows for the selection of a wavelength of light incident on said image sensor using a FILTER POSITIONING MECHANISM 7, allows for the control of an exposure time at said wavelength, allows for the readout and digitization of analog uncompensated pixel values generated by said image sensor via an AMPLIFICATION AND DIGITIZATION CIRCUIT 6, allows for the photometric compensation of the uncompensated pixel values using a COMPENSATION TABLE 5, and allows for the storage of a compensated digital signal representation of an image of an object or a portion thereof in a DIGITAL MEMORY 2. The microprocessor further provides for communication with a host computer via a SMALL COMPUTER SYSTEM INTERFACE 3. The communication with the host computer allows for external command signals to be received by the microprocessor from the host computer as well as for data in the form of digital signal representations of a multiplicity of monocolor images to be transferred from the camera to the host computer.

According to the preferred embodiment, a multicolor image of an object is comprised of separate monocolor images formed by the primary colors of visible light, that is to say, red, green, and blue light, respectively. Additionally, each monocolor image is comprised of two fields of rows of least resolvable picture elements, known in the art as "pixels," of said monocolor image. The rows of Field 1 are interlaced with the rows of Field 2. Interlacing of the rows of two fields to produce a television frame is well known to those skilled in the art.

1. Camera Initialization

Figure 2A:
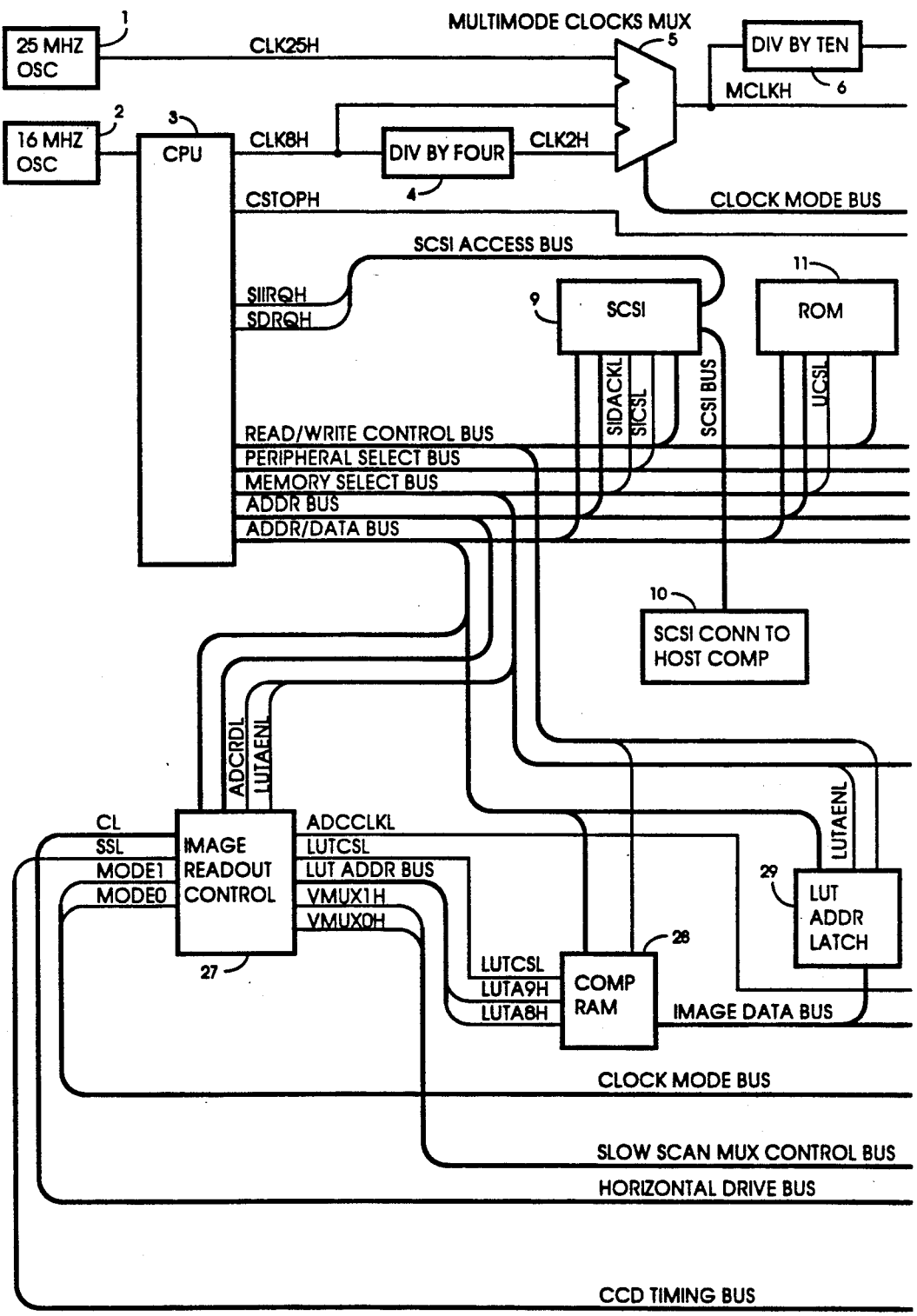
FIG. 2A is a partial schematic block diagram of the preferred embodiment of the present invention showing the portion of the camera that includes the Central Processing Unit (CPU), the timing circuitry that selects from three different clocks, the Read Only Memory (ROM) that stores firmware, the control circuitry that manipulates the compensation Random Access Memory (RAM), and the Small Computer Systems Interface (SCSI) that handles communication with the host computer.

In FIG. 2 there is shown a block diagram of the preferred embodiment of a computerized multicolor camera in accordance with the present invention. Central to the operation of the camera is the microprocessor designated as CPU 3 in FIG. 2A. In the preferred embodiment, CPU 3 is a microprocessor marketed by the Intel Corporation under the trade designation 80C188. All operations of CPU 3 are clocked by a crystal clock oscillator designated in FIG. 2A as 16 MHZ OSC 2 oscillating at a frequency of 16 megahertz.

Internal to CPU 3 are a number of what are known in the art as "internal peripherals," namely, a timer/counter, an interrupt controller, a DMA controller, and peripheral chip selects. Each of said internal peripherals must be programmed during initialization of the camera in order for proper operation of CPU 3 to occur.

Resident software programs to control all operations of the camera are permanently stored in a read only memory designated as ROM 11 in FIG. 2A. Said software programs control the sequences of operations executed by CPU 3. CPU 3 is designed to address one megabyte of digital memory in units of 16 bytes that are known in the art as "paragraphs." Said paragraphs are numbered from 0000h to FFFFh, using the hexadecimal number system. Buses designated as READ/WRITE CONTROL BUS, PERIPHERAL SELECT BUS, MEMORY SELECT BUS, ADDR/DATA BUS and ADDR BUS in FIG. 2A provide a multiwire signal path between CPU 3 and all camera circuits, including read-only memory designated ROM 11 in FIG. 2A and between CPU 3 and random access memory designated as RAM 12 in FIG. 2B. Resident software programs must be located in the uppermost paragraphs of the addressable memory space of ROM 11 to ensure that CPU 3 executes the proper initialization sequence when powered on. Read only memories, random access memories, and resident software program storage to control the operations of a microprocessor are well known to those skilled in the art. Each time the camera is powered on, the initialization program resident in ROM 11 is executed to prepare the camera for operation. Said initialization program is executed independent of any external control of the camera by the host computer. When powered on, CPU 3 will automatically begin executing a set of software instructions found in the paragraph beginning at address FFFFh of ROM 11. FIG. 3 shows the flow chart for the initialization program designated INIT_188. This program is comprised of 13 steps which are executed in the following sequence:

Step 1

Initialize ROM Access

Since adequate space for the entire initialization program is not available in the 16-byte paragraph FFFFh of ROM 11, the very first requirement of the initialization program is to enable CPU 3 to transfer out of said paragraph to additional instruction storage also located in ROM 11. This is performed by enabling upper memory access by programming an internal control register, designated UMCS in the literature published by the Intel Corp. Said register of the Intel 80C188 microprocessor (CPU 3) is associated with the chip select signal line designated UCSL in FIG. 2A, in the preferred embodiment. Said internal register UMCS is programmed by the initialization program so that memory fetches to ROM 11 cause chip select signal line UCSL to be asserted. Programming internal peripheral units of a microprocessor by means of setting internal registers is well known to those skilled in the art.

Step 2

Initialize RAM Access

The program then transfers from said paragraph FFFFh to the physical start the balance of the initialization program in ROM 11. Low memory access is enabled by programming an internal control register designated LMCS in literature published by the Intel Corp. Said register of the Intel 80C188 microprocessor (CPU 3) is associated with the chip select signal line designated LCSL in FIG. 2B, in the preferred embodiment. Said internal register LMCS is programmed by the initialization program so that memory fetches to RAM 12 cause chip select signal line LCSL to be asserted.

Step 3

Initialize ADC, DMA, and LUT Address Latch Access

Figure 2B:
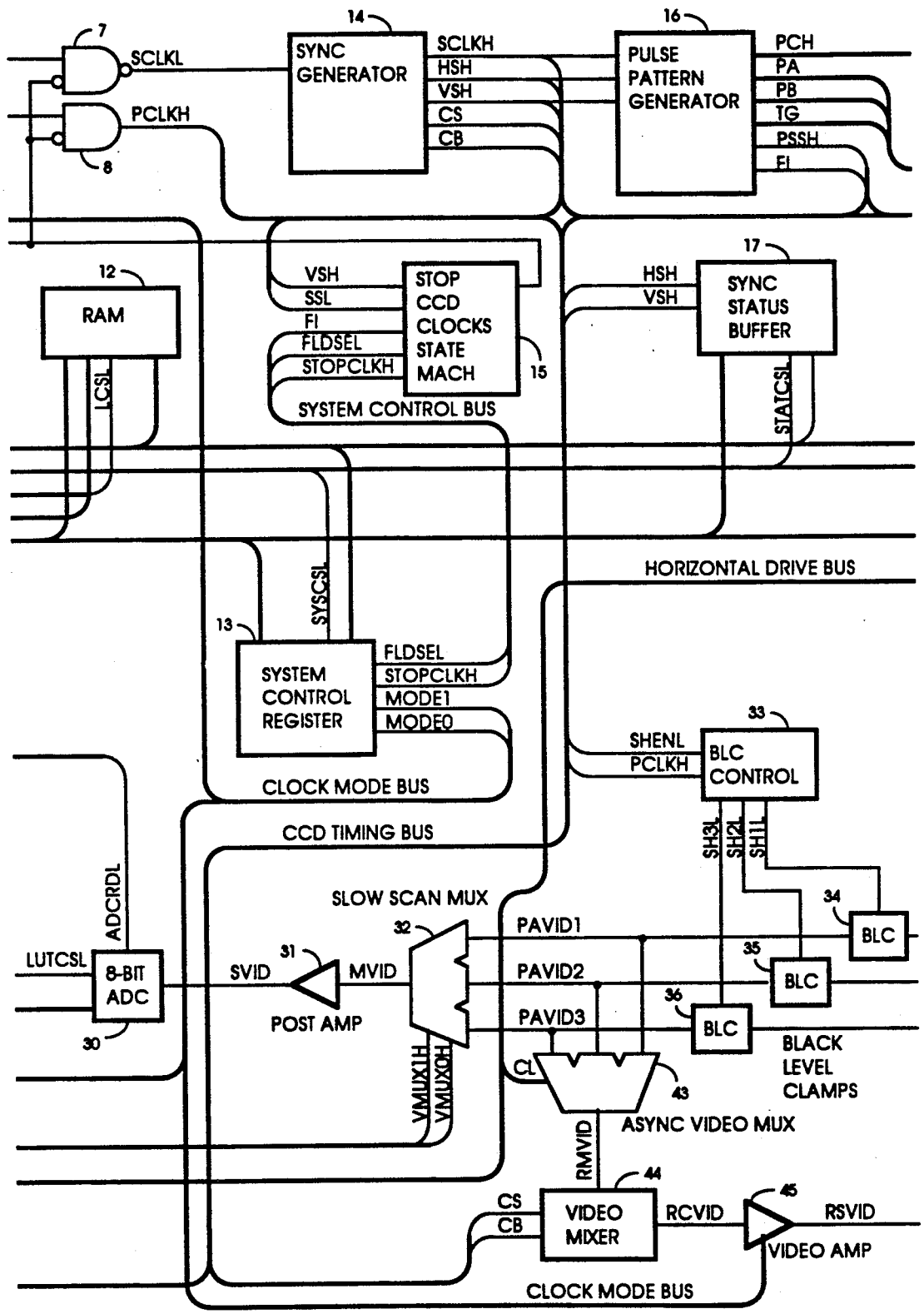
FIG. 2B is a partial schematic block diagram of the preferred embodiment of the present invention showing all major timing and synchronization circuitry (except for the pixel generator), RAM for the CPU, the control register whose contents determine the camera's mode of operation, the read-out and clamping circuitry for the amplified video including both slow scan multiplexer with both its associated post amplifier and Analog-to-Digital Converter (ADC), and the asynchronous video mixer and its associated video amplifier.
Figure 3:
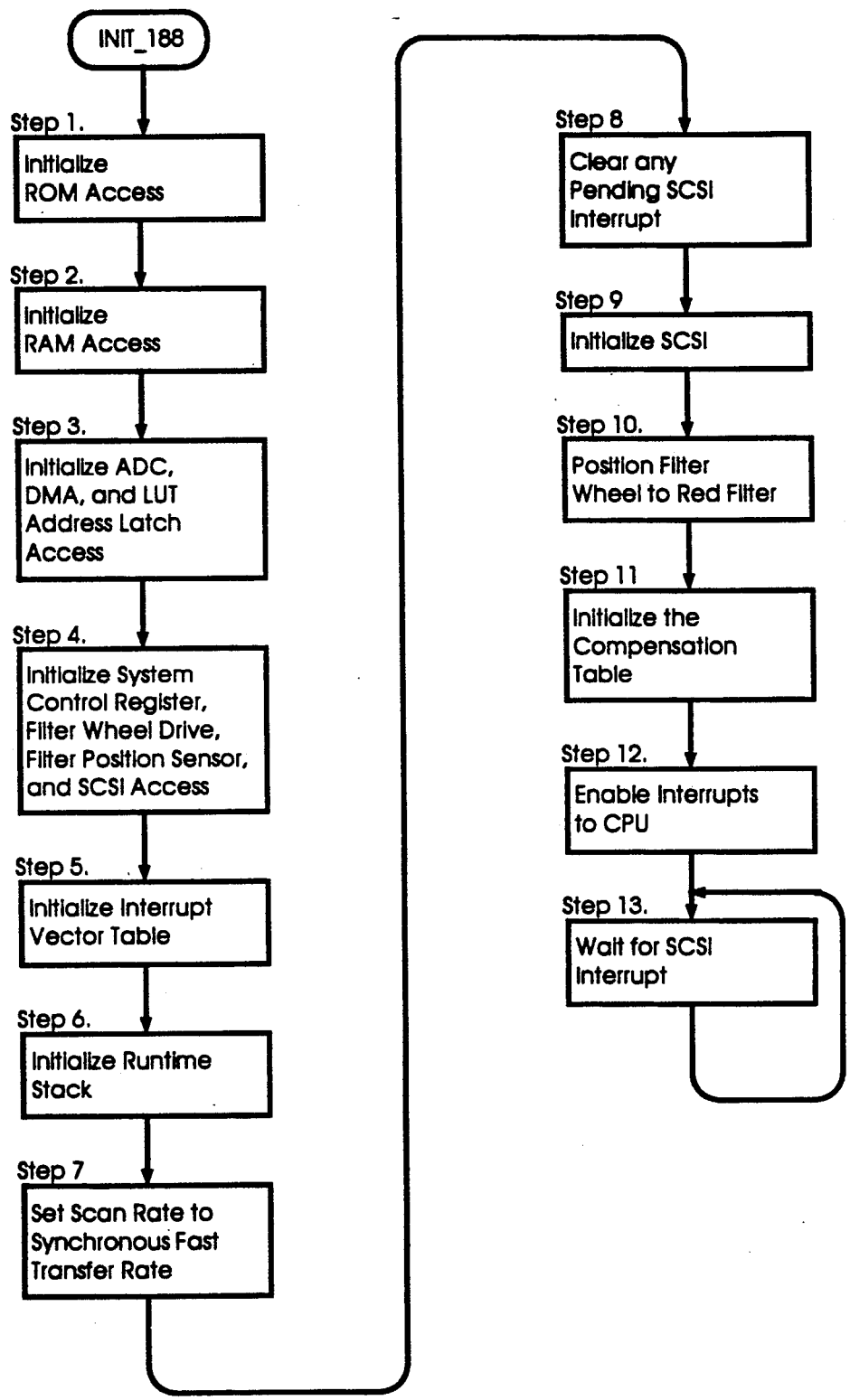
FIG. 3 is the software program flow chart for the camera initialization sequence according to the preferred embodiment.

Middle memory peripherals access is enabled by programming an internal control register designated MMCS in literature published by the Intel Corp. Said register of the Intel 80C188 microprocessor (CPU 3) is associated with four middle memory chip select signal lines, which are designated MCS0, MCS1, MCS2, and MCS3 in literature published by the Intel Corp. The first three of these lines are used in the preferred embodiment as follows:

chip select signal line MCS0 is designated ADCRDL in FIG. 2B and drives the chip select input of the chip designated 8-BIT ADC 30 in FIG. 2B at one of the inputs thereof;

chip select signal line MCS1 is designated SIDACKL in FIG. 2A and drives the DMA acknowledge input of the chip designated SCSI 9 in FIG. 2A; and chip select signal line MCS2 is designated LUTAENL in FIG. 2A and drives the latch enable input of the chip designated LUT ADDR LATCH 29 as well as the circuit designated IMAGE READOUT CONTROL 27 in FIG. 2A.

Said internal register MMCS is programmed by the initialization program so that memory reads from 8-BIT ADC 30, DMA transfers via SCSI 9 to the host computer, and memory writes to LUT ADDR LATCH 29 are executed properly by having their respective chip select signal lines asserted.

Step 4

Figure 2C:
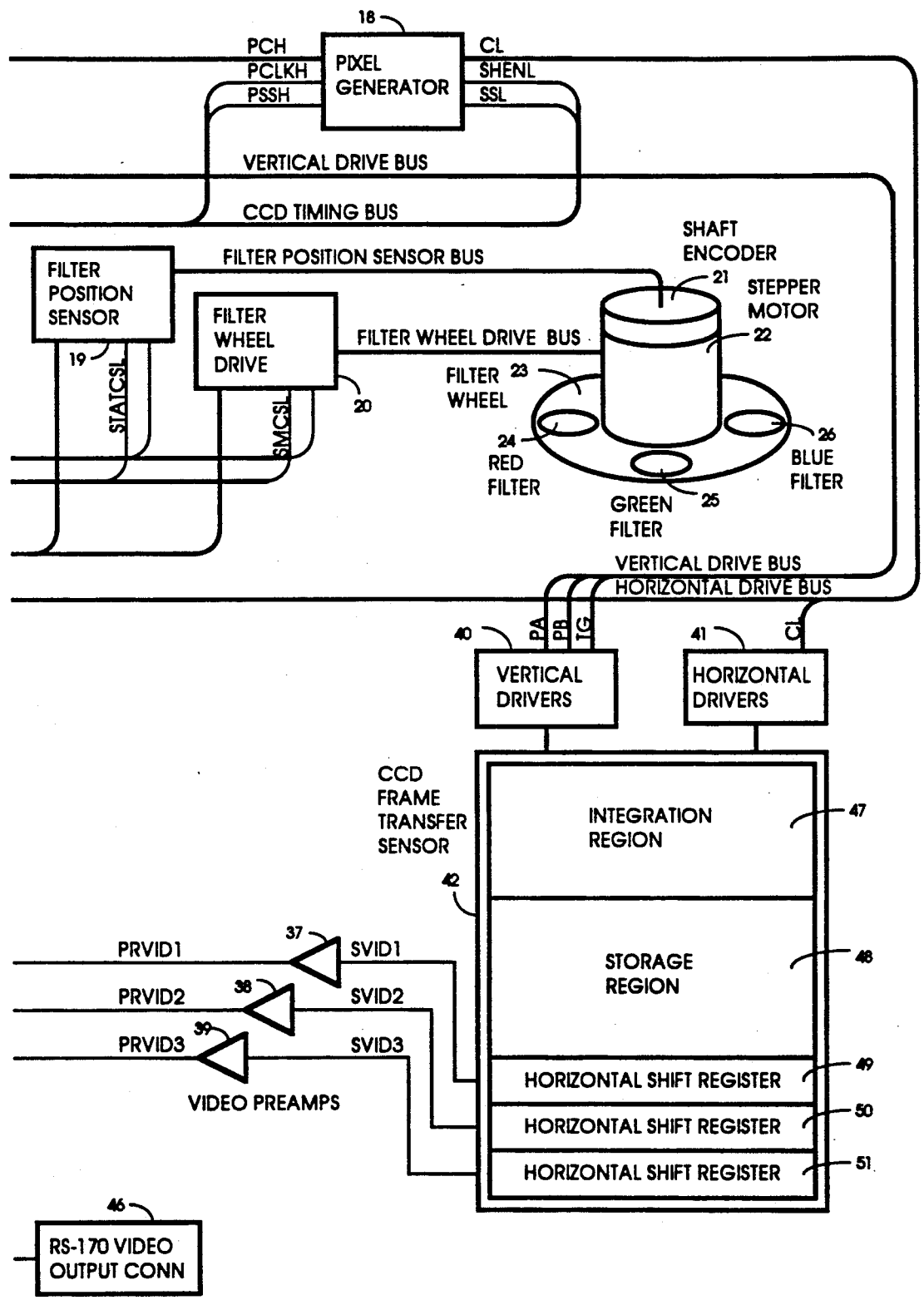
FIG. 2C is a partial schematic block diagram of the preferred embodiment of the present invention showing the pixel generator, the filter wheel with both its control circuitry and position sensing devices, the Charge-Coupled Device (CCD) frame-transfer image sensor, its vertical and horizontal drivers, and its video preamplifiers.

Initialize System Control Register, Filter Wheel Drive, Filter Position Sensor, and SCSI Access Peripheral support access is enabled by programming the internal register designated PACS in literature published by the Intel Corp. Said register of the Intel 80C188 microprocessor (CPU 3) is associated with seven chip select signal lines, which are designated PCS0, PCS1, PCS2, PCS3, PCS4, PCS5, PCS6, and PCS7 in literature published by the Intel Corp. The first four of these lines are used in the preferred embodiment as follows:

chip select signal line PCS0 is designated SYSCSL in FIG. 2 and drives the chip select input of the circuit designated SYSTEM CONTROL REGISTER 13 in FIG. 2B;

chip select signal line PCS1 is designated SMCSL in FIG. 2 and drives the chip select input of the circuit designated FILTER WHEEL DRIVE 20 in FIG. 2C;

chip select signal line PCS2 is designated STATCSL in FIG. 2 and drives the chip select input of the circuit designated FILTER POSITION SENSOR 19 in FIG. 2C.

chip select signal line PCS3 is designated SICSL in FIG. 2A and drives the chip select input of SCSI 9 in FIG. 2A.

Said internal register PACS is programmed by the initialization program so that peripheral fetches to/from circuits SYSTEM CONTROL REGISTER 13, FILTER WHEEL DRIVE 20, FILTER POSITION SENSOR 19, and chip SCSI 9, cause chip select signal lines SYSCSL, SMCSL, STATCSL, and SICSL respectively, to be asserted.

Step 5

Initialize Interrupt Vector Table

RAM 12 is prepared for the proper servicing of interrupts to the Intel 80C188 Microprocessor (CPU 3). It should be noted that interrupt request signal lines to CPU 3 are designated CSTOPH and SIIRQH in FIG. 2A. First, the interrupt vector table, which occupies the first kilobyte in RAM 12, is cleared, and the interrupt service routine vector associated with interrupt service routine vector associated with interrupt request signal line CSTOPH to CPU 3 from the circuit designated STOP CCD CLOCKS STATE MACH 15 in FIG. 2B are initialized to point to their respective interrupt service routines. Note that in combination, interrupt request signal lines SIIRQH and DMA request line SDRQH, described hereinafter, comprise the bus designated SCSI ACCESS BUS in FIG. 2A. The initialization of interrupt vector tables in random access memory by a microprocessor is well known to those skilled in the art.

Step 6

Initialize Runtime Stack

The runtime stack is initialized by setting the internal register designated SP (stack pointer) in literature published by the Intel Corp. Said register of the Intel 80C188 microprocessor (CPU 3) is set to point to the top of stack design location. The ensures that CPU 3 and RAM 12 are in the proper state to respond to interrupt requests. Initializing a runtime stack in a microprocessor is well known to those skilled in the art.

Step 7

Set Scan Rate to Synchronous Fast Transfer Rate

In the preferred embodiment, the scan frequency is set to the Synchronous Fast Transfer rate. Setting this scan rate and other scan rates is described hereinafter. Said scan rate setting also disables chip 8-BIT ADC 30 and the circuit designated ASYNC VIDEO MUX 43 in FIG. 2B, as described hereinafter.

Step 8

Clear any Pending SCSI Interrupt

Chip SCSI 9 is a Small Computer Systems Interface chip marketed by NCR Corporation under the trade designation 53C80. Since chip SCSI 9 sometimes issues a spurious interrupt request upon power on, an end-of-interrupt (EOI) command is issued to the internal interrupt control unit of the Intel 80C188 microprocessor (CPU 3) to clear any pending SCSI interrupt request.

Step 9

Initialize SCSI

SCSI 9 is initialized by clearing its data register, programming it as a target device, setting its target ID address, setting it to the idle state, and setting it to interrupt on initiator select. Programming the Small Computer System Interface as embodied in chip SCSI 9 is well known to those skilled in the art.

Step 10

Position Filter Wheel to Red Filter

In the preferred embodiment, the filter wheel designated FILTER WHEEL 23 in FIG. 2C, is moved to the red filter and the digital word located in RAM 12 in a location corresponding to the current filter wheel position is set to the value corresponding to that position, as described hereinafter.

Step 11

Initialize the Compensation Table

The random access memory used to store the compensation table, designated COMP RAM 28 in FIG. 2A, is initialized as described hereinafter.

Step 12

Enable Interrupts to CPU

The internal interrupt control unit of the Intel 80C188 microprocessor (CPU 3) is programmed to accept the interrupt requests issued by asserting interrupt request signal lines SIIRQH and CSTOPH. Programming a microprocessor to accept interrupt requests is well known to those skilled in the art.

Step 13

Wait for SCSI Interrupt

At this point, initialization of the preferred embodiment is complete, and the microprocessor (CPU 3) is left operating in what is known in the art as an "endless loop" and is enabled to accept interrupts in response to a command from a host computer. As described hereinafter, the endless loop is suspended whenever the host computer initiates a command sequence through SCSI 9. Once the command sequence requested by the host computer has been completed, return is made to the endless loop. The major command sequences for the preferred embodiment are described hereinafter.

2. Basic Camera Operations

Figure 4:
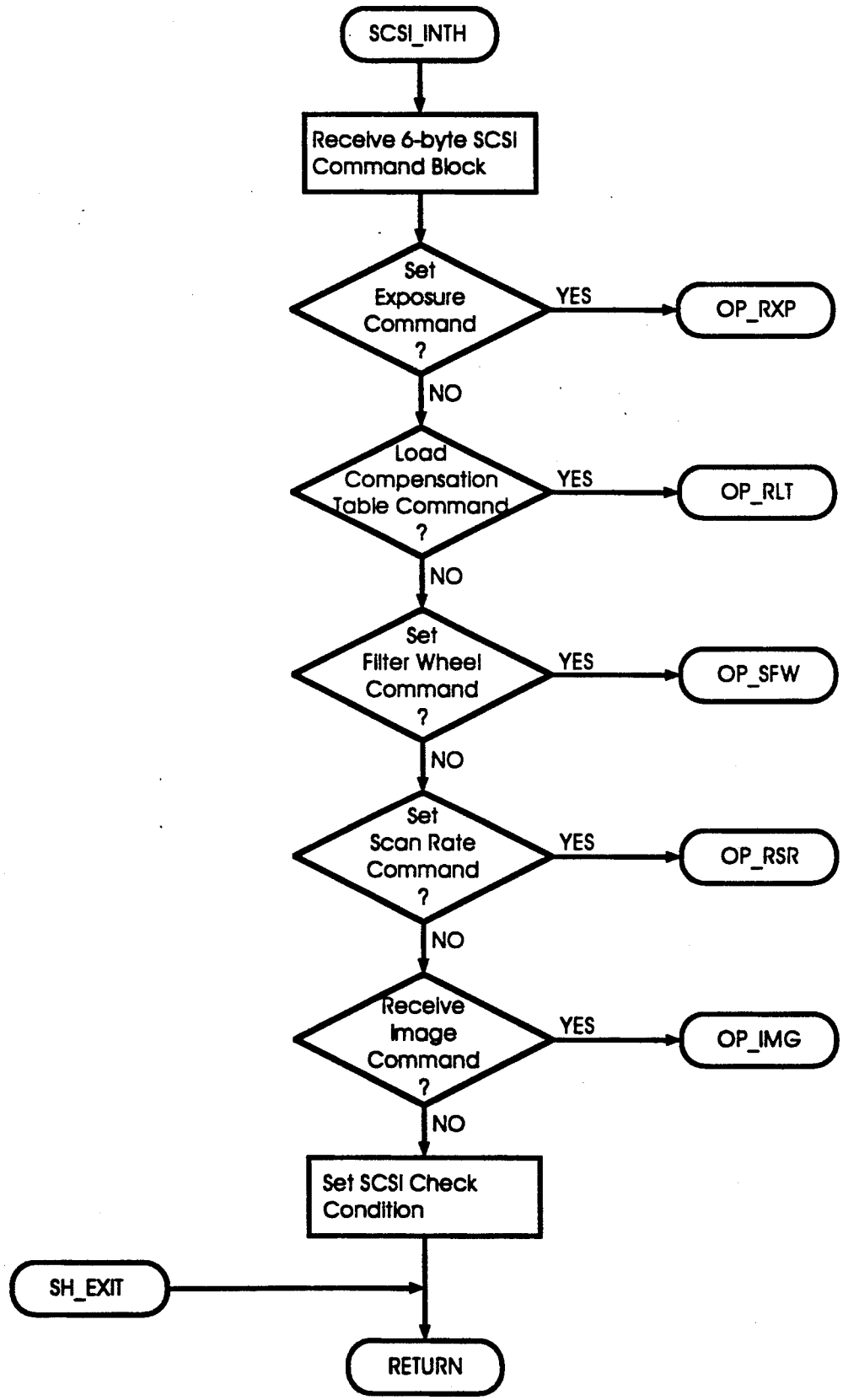
FIG. 4 through FIG. 9 are the software program flow charts describing control of the camera from the host computer according to the preferred embodiment.

FIG. 4 is a flow chart of interrupt service routine designated SCSI_INTH stored in ROM 11 that is entered whenever the host computer attempts communication with the camera via the bus designated SCSI BUS in FIG. 2A that is connected to the host computer by means of the electrical connector designated as SCSI CONN TO HOST COMP 10 in FIG. 2A in the preferred embodiment. Said interrupt service routine responds to a standard SCSI command known in the art as the "select command" and immediately receives the standard SCSI 6-byte Command Block from the host computer. SCSI communication from an initiator (host computer) to a target device (camera) is well known to those skilled in the art.

As shown in FIG. 4 software program SCSI_INTH causes CPU 3 to decode the parameters stored in the command block in order to determine the command to be executed. If the current command is one of the five commands which are recognized, CPU 3 branches to the corresponding command service routine, namely the Set Exposure Command, Load Compensation Table Command, Set Filter Wheel Command, Set Scan Rate Command, and Receive Image Command, respectively. Flow charts for each of said command service routines are shown in FIG. 5 through FIG. 9, respectively. Once a command service routine is completed, it returns control to program SCSI_INTH for proper termination of the interrupt service routine. If the command is not recognized or supported by the camera, a SCSI Check Condition is noted by CPU 3 and returned via SCSI 9 to the host computer using the signal lines in the SCSI BUS. The decoding of command signals and branching to stored command service routines by a microprocessor in response to commands received from a host computer via a SCSI are well known to those skilled in the art.

Command 1

Set Exposures Command Service Routine

In order to cause CPU 3 to store information in RAM 12 in those locations which are reserved for the red, green, and blue exposure values, the host computer interrupts CPU 3 via signal lines in the SCSI BUS to SCSI 9. This causes SCSI 9 to interupt CPU 3 over interrupt request signal line SIIRQH. CPU 3 then enters the interrupt service routine SCSI_INTH and a byte-by-byte transfer commences with each byte being received by CPU 3 by polling SCSI 9 using chip select signal line SICSL. Polling a chip (SCSI 9) by a mircroprocessor (CPU 3) using a chip select signal line (SICSL) is well known to those skilled in the art.

Figure 5:
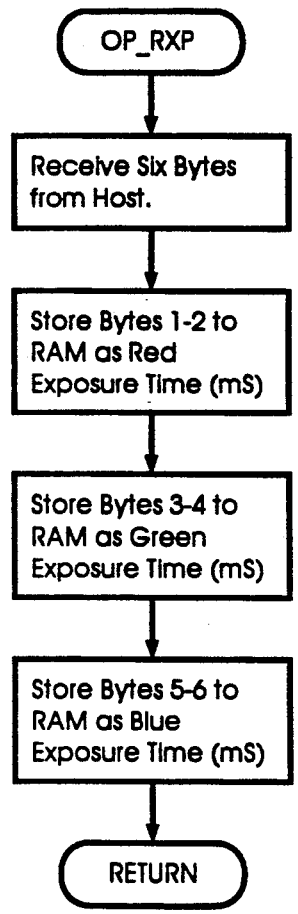

The first six bytes from the host computer are the SCSI Command Block corresponding to the command Set Exposures as described hereinbefore. CPU 3 decodes the command block and branches to command service routine OP_RXP stored in ROM 11. A flow chart of this program for the preferred embodiment is shown in FIG. 5.

Said OP_RXP routine causes CPU 3 to receive six additional bytes from from the host computer via SCSI 9. Each of these six bytes is received individually. In the preferred embodiment the first two bytes carry a 16-bit word whose value is expressed in milliseconds and is used to determine the red exposure time. The second two bytes are the value, expressed in milliseconds, which determine the green exposure time. The final two bytes are the value, expressed in milliseconds, which determine the blue exposure time. As these bytes are received they are stored in RAM 12 by CPU 3 which asserts the LCSL chip select signal line and uses the READ/WRITE CONTROL BUS, the MEMORY SELECT BUS, and ADDR BUS and the ADDR-/DATA BUS to write these words in RAM 12 in those locations which are reserved for the values of the red, green, and blue exposure times, respectively. The use of microprocessors to write in external RAM are well known to those skilled in the art.

Once said words are stored in RAM 12, CPU 3 executes a return to the software program designated SH_

EXIT and stored in ROM 11, that returns the SCSI status to the host computer, and clears the SCSI interrupt. Returning SCSI status to an initiator (host computer) and clearing an interrupt by a microprocessor (CPU 3) are well known to those skilled in the art. CPU 3 resumes operation in an endless loop, as described hereinbefore.

Command 2

Load Compensation Table Command Service Routine

Figure 6:
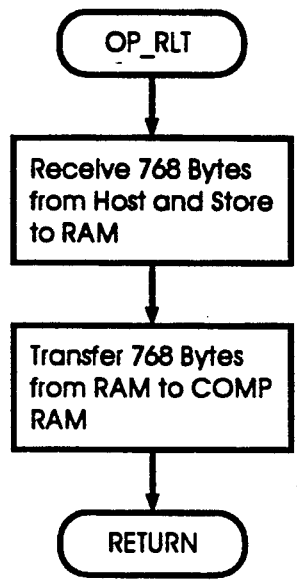

In order to load a photometric compensation table, the host computer interrupts CPU 3 via the SCSI BUS to SCSI 9 which signals CPU 3 over interrupt request signal line SIIRQH, as described hereinbefore. CPU 3 then enters the interrupt service routine SCSI_INTH and a byte-by-byte transfer commences with each byte being received by CPU 3 by polling SCSI 9 using chip select signal line SICSL, as described hereinbefore. The first six bytes from the host computer are the SCSI Command Block corresponding to the command Load Compensation Table, as described hereinbefore. CPU 3 decodes this command block and branches to the command service routine OP_RLT stored in ROM 11. A flow chart of this program for the preferred embodiment is shown in FIG. 6.

The first part of said OP_RLT routine causes CPU 3 to continue to transfer data on a byte-by-byte basis from the host computer, storing each byte in RAM 12 by activating chip select signal LCSL, the MEMORY SELECT BUS, the READ/WRITE CONTROL BUS, the ADDR BUS, and the ADDR/DATA BUS, as described hereinbefore. This operation continues until 768-bytes have been received.

In the preferred embodiment said 768-bytes represent three data compensation tables, each consisting of 256 bytes, which now must be transfered from RAM 12 to COMP RAM 28. In order to make this transfer, the routine OP_RLT causes CPU 3 to read each of the 768-bytes from RAM 12 and causes each byte to be written into COMP RAM 28. CPU 3 asserts the memory select line LUTAENL, which enables LUT ADDR LATCH 29 to latch the address presented on the 8-bit ADDR/DATA BUS, and by means of the circuit IMAGE READOUT CONTROL 27, causes chip select signal line designated LUTCSL in FIG. 2 to be asserted at the output thereof. Additionally, LUTAENL causes LUT ADDR LATCH 29 to assert the bus designated IMAGE DATA BUS in FIG. 2A at the outputs thereof and thereby provide the lower eight bits of the 768-position address required by COMP RAM 28. IMAGE READOUT CONTROL 27 uses the lower two bits of the 12-bit ADDR BUS to provide the upper two bits of the required 768-position address on the bus designated LUT ADDR BUS in FIG. 2A on signal lines designated LUTA8H and LUTA9H in FIG. 2A at the outputs thereof. Thus the entire 12-bit address needed to store data in COMP RAM 28 is made available.

Once said 768-byte compensation tables are stored in COMP RAM 28, CPU 3 executes a return to software program SH_EXIT stored in ROM 11, SCSI status is returned to the host computer, the SCSI interrupt is cleared, and CPU 3 resumes operation in an endless loop, as described hereinbefore.

Command 3

Set Filter Wheel Command Service Routine

The preferred embodiment includes FILTER WHEEL 23 that is coaxially mounted on a shaft (not shown) of an electronic stepper motor designated STEPPER MOTOR 22 in FIG. 2C. In the preferred embodiment, FILTER WHEEL 23 encorporates three color filters designated RED FILTER 24, GREEN FILTER 25 and BLUE FILTER 26 in FIG. 2C that pass the primary colors of visible light (red, green and blue, respectively). Filter wheels, filters, and stepper motors are well known to those skilled in the art.

A digital shaft encoder designated SHAFT ENCODER 21 in FIG. 2C is mechanically coupled to FILTER WHEEL 23 in the preferred embodiment, and provides digital signals over the bus designated FILTER POSITION SENSOR BUS in FIG. 2C representing a digital word corresponding to the rotational position of FILTER WHEEL 23 to FILTER POSITION SENSOR 19. When enabled by chip select signal STATCSL, FILTER POSITION SENSOR 19 provides a digital representation of the rotary position of FILTER WHEEL 23 on the ADDR/DATA BUS. Digital shaft encoders and their associated position sensors are well known to those skilled in the art.

STEPPER MOTOR 22 is connected to the output of the circuit FILTER WHEEL DRIVE 20. Pulses from FILTER WHEEL DRIVE 20 cause STEPPER MOTOR 22 to position FILTER WHEEL 23. When enabled by CPU 3 using chip select signal SMCSL, a pulse is generated by FILTER WHEEL DRIVE 20 on the signal line designated FILTER WHEEL DRIVE BUS in FIG. 2C at the output thereof that causes STEPPER MOTOR 22 to rotate its shaft (not shown) either forward or backward in accordance with a signal furnished to FILTER WHEEL DRIVE 10 by CPU 3 over the ADDR/DATA BUS.

Figure 7:
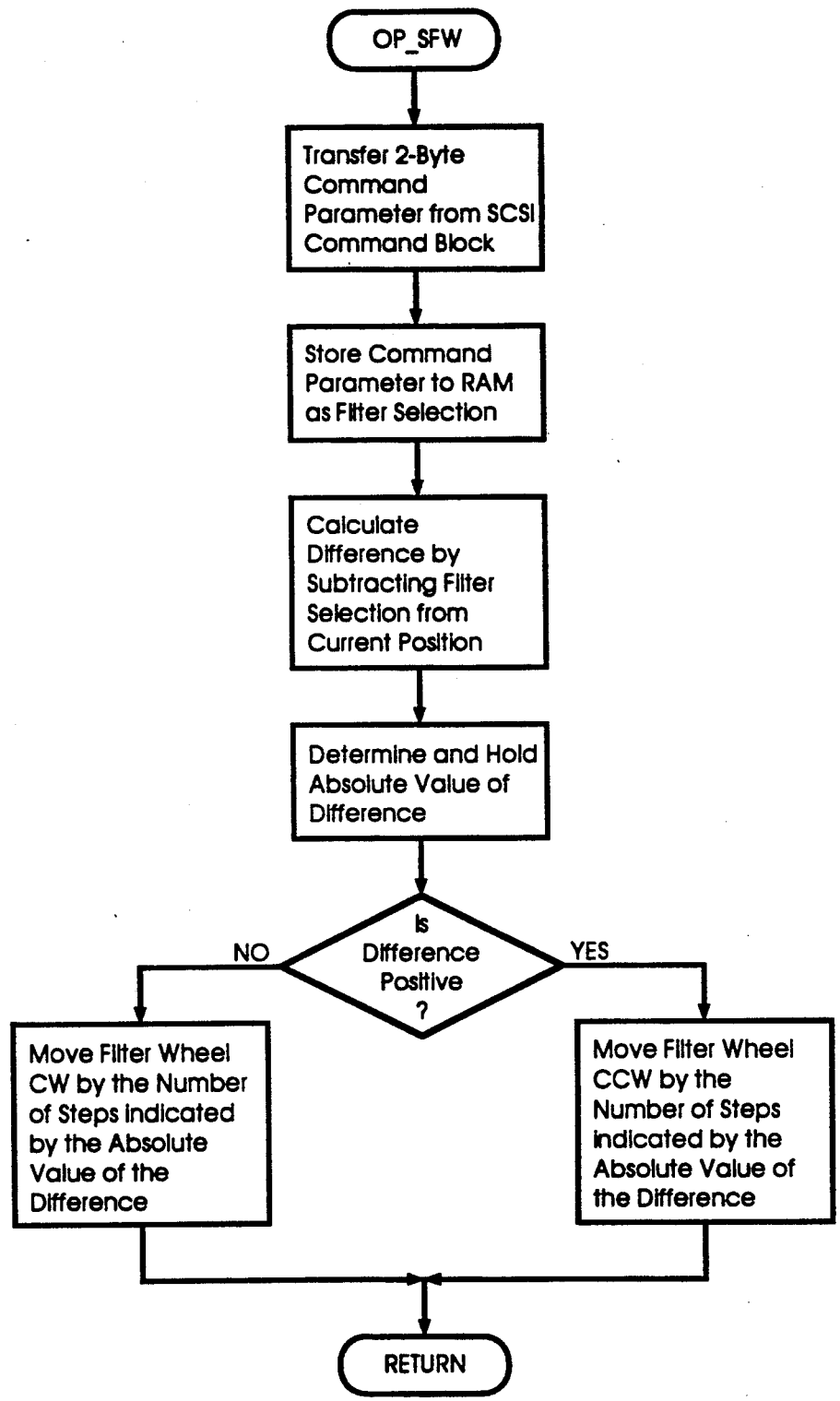

In order to cause CPU 3 to position FILTER WHEEL 23, the host computer interrupts CPU 3 via the SCSI BUS to SCSI 9 which signals CPU 3 over interrupt signal SIIRQH, as described hereinbefore. CPU 3 then enters the interrupt service routine SCSI_INTH and a byte-by-byte transfer commences with each byte being received by CPU 3 by polling SCSI 9 over chip select signal SICSL, as described hereinbefore. The first six bytes from the host computer are the SCSI Command Block corresponding to the command Set Filter Wheel, as described hereinbefore. CPU 3 decodes the command block and branches to the command service routine OP_SFW stored in ROM 11. A flow chart of this program for the preferred embodiment is shown in FIG. 7.

As is well known to those skilled in the art, the SCSI Command Block may accomodate a two-byte parameter as a command parameter. In this case, the two-byte parameter is the numerical value of the desired filter wheel position. The OP_SFW routine first causes CPU 3 to execute a byte-by-byte transfer of said two-byte value of the desired filter wheel position to RAM 12 as described hereinbefore. The location used in RAM 12 corresponds to that reserved for the value of the desired position of FILTER WHEEL 23. The value of the actual position of FILTER WHEEL 23 is stored in RAM 12 in a 16-bit location reserved for the present position of FILTER WHEEL 23, as described hereinbefore.

Next, routine OP_SFW causes CPU 3 to make a comparison between the desired position and the actual position of FILTER WHEEL 23, by subtracting the filter selection from the current position, to determine whether STEPPER MOTOR 22 should be stepped in the clockwise (CW) or counterclockwise (CCW) direction. If the difference is positive, CPU 3 is instructed by routine OP_SFW to assert chip select signal SMCSL and to place directional information corresponding to the CCW direction over the ADDR/DATA BUS to FILTER WHEEL DRIVE 20, thus causing STEPPER MOTOR 22 to move FILTER WHEEL 23 by one increment in the CCW direction. Additionally, CPU 3 decrements said absolute value, and continues this process until said absolute value of the difference is zero. However, if said difference is negative, CPU 3 is instructed by routine OP_SFW to assert chip select signal SMCSL and to place directional information corresponding to the CW direction instead. The movement of FILTER WHEEL 23 and the decrementing of the absolute value are otherwise identical to the CCW process.

Finally, now that FILTER WHEEL 23 is positioned, CPU 3 executes a return to software program SH_EXIT stored in ROM 11, which returns the SCSI status to the host computer, clears the SCSI interrupt, and CPU 3 resumes operation in an endless loop, as described hereinbefore.

Command 4

Set Scan Rate Command Service Routine

It should be understood that in the preferred embodiment timing signals to the image sensor may be provided by the microprocessor (CPU 3) in synchronism with 16 MHZ OSC 2, or may be provided from another asynchronous oscillator, designated 25 MHZ OSC 1 in FIG. 2A, or may be stopped entirely during an exposure time. These various timing modes are established by logic voltages on signal lines designated MODE0 and MODE1 in FIG. 2B that appear at two of the four outputs of SYSTEM CONTROL REGISTER 13 and in combination comprise the CLOCK MODE BUS in FIG. 2B. The other two outputs of SYSTEM CONTROL REGISTER 13 are the signal lines designated STOPCLKH and FLDSEL that comprise the bus designated SYSTEM CONTROL BUS in FIG. 2B.

In the preferred embodiment of the invention, the logic voltage that appears on the signal line designated CLK8H in FIG. 2A oscillates at an 8 megahertz frequency derived from 16 MHZ OSC 2 by CPU 3, as is well known to those skilled in the art of microprocessors. This signal line is connected to a digital frequency divider designated DIV BY FOUR 4 in FIG. 2A at the input thereof. DIV BY FOUR 4 provides an output logic voltage on the signal line designated CLK2H in FIG. 2A at the output thereof having a frequency of 2 megahertz. In addition, the output of 25 MHZ OSC 1 provides an output logic voltage oscillating at 25 megahertz at the output thereof on the signal line designated CLK25H in FIG. 2A. Signal line CLK25H is connected to a digital multiplexor designated MULTIMODE CLOCKS MUX 5 in FIG. 2A at the first of three inputs thereof; the other two inputs thereof are CLK8H and CLK2H. MULTIMODE CLOCKS MUX 5 provides at its output on the signal line designated MCLKH in FIG. 2A a logical voltage substantially the same as a selected one of its three input logic voltages according to the Table 1 below.

TABLE 1

| Master Clock Control and Timing | | | | |
|---|---|---|---|---|
| MODE1 | MODE0 | MCLKH = | FREQUENCY | SCAN RATE |
| low | low | CLK2H | 2 MHz | Synchronous Slow Scan |
| low | high | CLK8H | 8 MHz | Synchronous Fast Transfer |
| high | low | CLK25H | 25 MHz | Asynchronous Real Time Video |
| high | high | n/a | n/a | n/a |

Signal line MCLKH is applied to a logic gate designated 8 in FIG. 2B at the input thereof; the output thereof is designated PCLKH in FIG. 2B. Additionally signal line MCLKH is applied to a digital frequency divider designated DIV BY TEN 6 in FIG. 2A at the input thereof. The output thereof is connected to logic gate designated 7 in FIG. 2B at the input thereof. Logic gate 7 produces a logic voltage at the output thereof on the signal line designated SCLKL in FIG. 2B. It should be noted that logic gates 7 and 8 may have their outputs disabled by a logic high signal on signal line CSTOPH, which is the output of STOP CCD CLOCKS STATE MACH 15.

Figure 8:
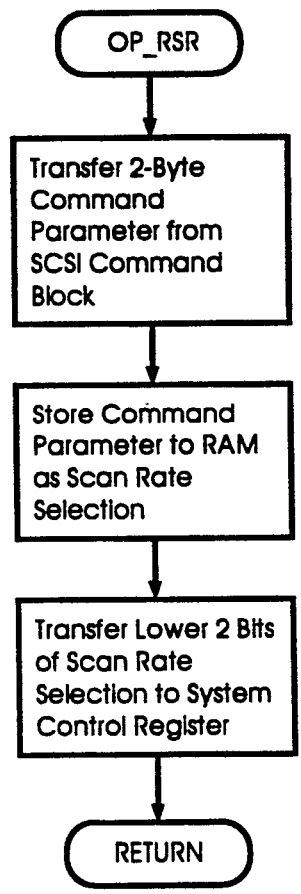

In order for the timing frequency (scan rate) to be set by the host computer, the host computer must interrupt CPU 3 and store information in RAM 12 in that location which is reserved for the scan rate value. The host computer interrupts CPU 3 via the SCSI BUS to SCSI 9, which signals CPU 3 over interrupt request signal line SIIRQH, as described hereinbefore. CPU 3 then enters the interrupt service routine SCSI_INTH and a byte-by-byte transfer commences with each byte being received by CPU 3 by polling SCSI 9 using chip select signal line SICSL, as decribed hereinbefore. The first six bytes from the host computer are the SCSI Command Block corresponding to the command Set Scan Rate. As described hereinbefore, the SCSI Command Block accomodates a two-byte parameter as a command parameter so that, in this case, the scan rate value is included in the command block, as described hereinbefore. CPU 3 decodes the command block and branches to the command service routine OP_RSR stored in ROM 11. A flow chart of this program for the preferred embodiment is shown in FIG. 8.

The OP_RSR routine first causes CPU 3 to execute a byte-by-byte transfer of said two-byte scan-rate value found in the command block as a 16-bit word to RAM 12 in a location in RAM 12 reserved for the scan-rate value in a manner described hereinbefore. Next, CPU 3 copies the lower two bits of the scan-rate value from RAM 12 to SYSTEM CONTROL REGISTER 13 by asserting peripheral chip select signal line SYSCSL, and using the READ/WRITE CONTROL BUS the ADDR/DATA BUS. The SYSTEM CONTROL REGISTER 13 stores this two-bit value which sets output lines MODE1 and MODE0 accordingly. As described hereinbefore, the MODE1 and MODE0 signal lines provide inputs to MULTIMODE CLOCKS MUX 5, causing it to select one clock frequency from signal lines CLK2H, CLK8H, or CLK25H according to Table 1 above. The selected clock frequency then appears as the output of the MULTIMODE CLOCKS MUX 5 on signal line MCLKH.

Operation of the camera at either the Synchronous Slow Scan rate or the Synchronous Fast Transfer rate is synchronized to CPU 3, due to the fact that all clock control signals are derived from 16 MHZ OSC 2. This ensures exact determination of the placement of each pixel value in the image generated by the camera with no pixel jitter, as described hereinafter. However, in the preferred embodiment, neither the Synchronous Slow Scan rate nor the Synchronous Fast Transfer rate are fast enough to accomodate the pixel rate required to produce real-time video for convenient focusing.

Figure 10:
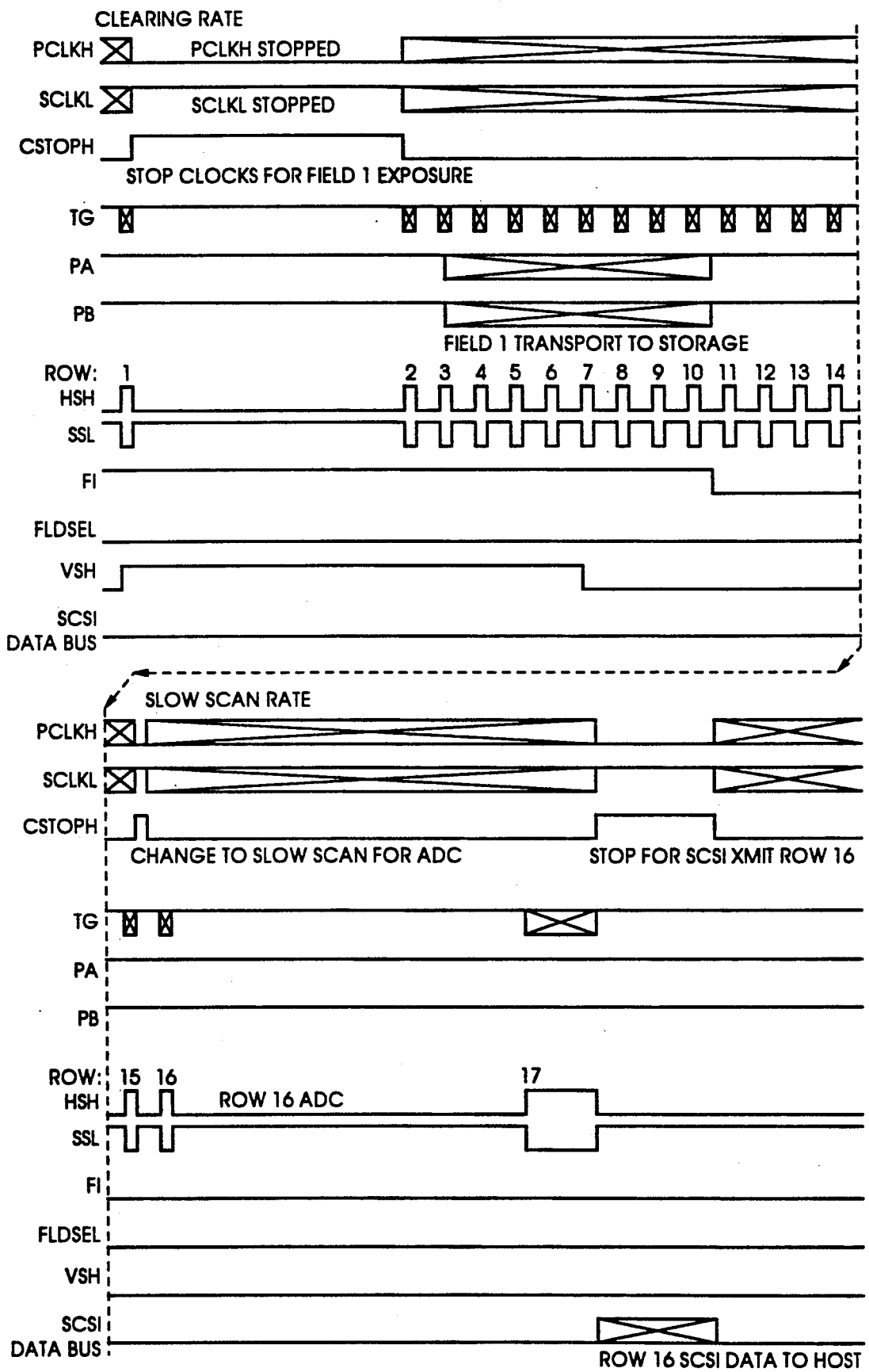
FIG. 10 is a graphic representation of camera signals, all on the same time base, associated with Field 1 of an image according to the embodiment of FIG. 2; and, FIG. 11 is a graphic representation of camera signals, on an expanded time base, showing the time relationship of black level clamp signals and the row digitization signals according to the embodiment of FIG. 2.

In the preferred embodiment, the image sensor designated CCD FRAME TRANSFER SENSOR 42 in FIG. 2C is marketed by Philips Components Inc. under the trade designation NXA1031. Said image sensor requires four sets of logic timing signals for operation. These are provided on the buses designated VERTICAL DRIVE BUS in FIG. 2C and HORIZONTAL DRIVE BUS in FIG. 2C. Said VERTICAL DRIVE BUS is comprised of signal buses PA (A-phase logic signals), PB (B-phase logic signals), and TG (Transfer Gates logic signals), with logic voltages thereon produced by the chip designated PULSE PATTERN GENERATOR 16 in FIG. 2B at outputs thereof. Said HORIZONTAL DRIVE BUS is comprised of signal lines CL (C-phase logic signals) with logic voltages thereon produced by the circuit designated PIXEL GENERATOR 18 in FIG. 2C at outputs thereof. Timing for said buses is shown in FIG. 10. Control of the Philips Components Inc. frame transfer sensor NXA1031 (CCD FRAME TRANSFER SENSOR 42) by means of A-phase logic signals, B-phase logic signals, Transfer Gates logic signals, and C-phase logic signals is well known to those skilled in the art.

In the preferred embodiment, to provide real-time video, CPU 3 sets the MODE1 and MODE0 signals to logic high and logic low, respectively. As shown in Table 1 above, this causes all CCD control clock signals to be derived from asynchronous 25 MHZ OSC 1, whose output signal CLK25H appears at the output of MULTIMODE CLOCKS MUX 5 on signal line MCLKH, at what is designated the Asynchronous Real-Time Video rate. The signal lines MODE0 and MODE1 are input to IMAGE READOUT CONTROL 27 via the CLOCK MODE BUS. When logic voltages on signal lines MODE1 and MODE0 are set for the Asynchronous Real-Time Video rate, IMAGE READOUT CONTROL 27 sets logic voltages on signal lines designated VMUX1H and VMUX0H in FIG. 2A at the output thereof, that in combination comprise the SLOW SCAN MUX CONTROL BUS in order to disable the multiplexor designated SLOW SCAN MUX 32 in FIG. 2B. In addition, signal lines MODE1 and MODE0 of the CLOCK MODE BUS are connected to the gated video amplifier, designated VIDEO AMP 45 in FIG. 2B at the inputs thereof. When logic voltages on these signal lines are set for the Asynchronous Real-Time Video rate, VIDEO AMP 45 is enabled.

It should be noted that the HORIZONTAL DRIVE BUS is connected to the video multiplexor designated ASYNC VIDEO MUX 43 in FIG. 2B. HORIZONTAL DRIVE BUS signals CL cause ASYNC VIDEO MUX 43 to multiplex signals designated PAVID1, PAVID2, and PAVID3 in FIG. 2B, in the sequence required to produce real-time video on the signal line designated RMVID in FIG. 2B. Generation of signals PAVID1, PAVID2, and PAVID3 are described hereinafter as is the operation of the image sensor designated CCD FRAME TRANSFER SENSOR 42.

The control bus designated CCD TIMING BUS in FIG. 2 is comprised of eight signals generated from four sources: signal line PCLKH is generated by logic gate 8; signal lines HSH, VSH, CS, and CB are generated by SYNC GENERATOR 14 at outputs thereof; signal line FI is generated by PULSE PATTERN GENERATOR 16 at an output thereof; and signal lines SHENL and SSL are generated by PIXEL GENERATOR 18 at outputs thereof.

Signal line RMVID is connected to the video mixer designated VIDEO MIXER 44 in FIG. 2B. In addition, signal lines CS (composite sync) and CB (composite blanking) are connected to VIDEO MIXER 44 to additional inputs thereof to enable VIDEO MIXER 44 to generate real-time composite video on the signal line designated RCVID in FIG. 2B. Signal RCVID is amplified by VIDEO AMP 45 to generate an amplified real-time video on the signal designated RSVID in FIG. 2B. In turn signal line RSVID in connected to an output connector designated RS-170 VIDEO OUTPUT CONN 46 in FIG. 2.

The generation of real-time composite video from CCD frame transfer sensors is well known to those skilled in the art. In fact it should be noted that, in the preferred embodiment, SYNC GENERATOR 14 is marketed by Philips Components Inc. under the trade designation SAA1043, PULSE PATTERN GENERATOR 16 is marketed by Philips Components Inc. under the trade designation SAD1019, PIXEL GENERATOR 18 is a circuit functionally equivalent to the chip marketed by Philips Components Inc. under the trade designation TDA4302, VERTICAL DRIVERS 40 is marketed by Philips Components Inc. under the trade designation TDA4301, HORIZONTAL DRIVERS 41 is marketed by Philips Components Inc. under the trade designation TDA4305, and, as stated hereinbefore, CCD FRAME TRANSFER SENSOR 42 is marketed by Philips Components Inc. under the trade designation NXA1031. These devices in combination with video preamplifiers designated VIDEO PREAMPS 37–39 in FIG. 2C and black level clamps designated BLC 34–36 in FIG. 2B described hereinafter, and ASYNCH VIDEO MUX 43 and VIDEO MIXER 44 described hereinbefore, when operating at the Fast Asynchronous Transfer Rate at a frequency determined by 25 MHZ OSC 1, comprise in combination a real-time video monocolor electronic camera producing 30 frames per second essentially identical to a real-time video monocolor camera marketed by Philips Components Inc. under the trade designation NO56471.

Thus the novelty of the preferred embodiment lies not in the separate or combined design of the chips described hereinabove operating at the Asynchronous Fast Transfer Rate but rather in the ability of the preferred embodiment to operate in synchronism with the CPU 3 clock at the Synchronous Fast Transfer Rate, the Synchronous Slow Scan Rate, or with timing disabled during an exposure time as described hereinafter.

Once the scan rate has been set, CPU 3 executes a return to software program SH_EXIT in ROM 11, that returns the SCSI status to the host computer and clears the SCSI interrupt; the scan rate remains at the frequency selected by the host computer. CPU 3 resumes operation in an endless loop, as described hereinbefore.

Command 5

Receive Image Command Service Routine

In the preferred embodiment CCD FRAME TRANSFER SENSOR 42 is clocked by logic voltages on signal lines SCLKL and PCLKH whose frequencies are determined by MCLKH in accordance Table 1, as described hereinbefore. As shown in FIG. 2A and FIG. 2B, signal SCLKL is input to SYNC GENERATOR 14 and signal PCLKH is input to PIXEL GENERATOR 18. In turn, signals SCLKH, HSH, and VSH are provided by SYNC GENERATOR 14 at the outputs thereof, which are input to PULSE PATTERN GENERATOR 16. PULSE PATTERN GENERATOR 16 and PIXEL GENERATOR 18 in combination provide inputs to VERTICAL DRIVERS 40 and HORIZONTAL DRIVERS 41, which, in turn, control the operation of CCD FRAME TRANSFER SENSOR 42, as described hereinafter.

In the preferred embodiment CCD FRAME TRANSFER SENSOR 42 generates sequential analog voltages representative of pixel values at three outputs thereof. Said voltages are produced on signal lines designated SVID1, SVID2, and SVID3 in FIG. 2C by charge-coupled shift registers internal to CCD FRAME TRANSFER SENSOR 42 designated HORIZONTAL SHIFT REGISTERS 49-51. These signal lines are connected to VIDEO PREAMPS 37-39 in FIG. 2C at the inputs thereof, generating preamplified analog voltages on signal lines designated PRVID1, PRVID2, and PRVID3 in FIG. 2C at the outputs thereof. Analog voltages on these signal lines are connected to black level clamps BLC 34-36 at the inputs thereof. Signal preamplifiers and black level clamps are described hereinafter.

The preamplified and clamped signals are connected to analog multiplexor SLOW SCAN MUX 32 at the inputs thereof over signal lines designated PAVID1, PAVID2, and PAVID3 in FIG. 2B. The signal line at the output of SLOW SCAN MUX 32 is designated MVID in FIG. 2B and is connected to the amplifier designated POST AMP 31 in FIG. 2B at the input thereof to generate an amplified multiplexed analog voltage on signal line designated SVID in FIG. 2B at the output thereof. The signal line SVID is connected to 8-BIT ADC 30 at the input thereof. CPU 3 controls and synchronizes all of these circuits and their signals in their operations by means of logic voltages applied on signal lines from the outputs of STOP CCD CLOCKS STATE MACH 15, SYSTEM CONTROL REGISTER 13, and the circuit designated BLC CONTROL 33 in FIG. 2B, as described hereinafter.

Figure 9:
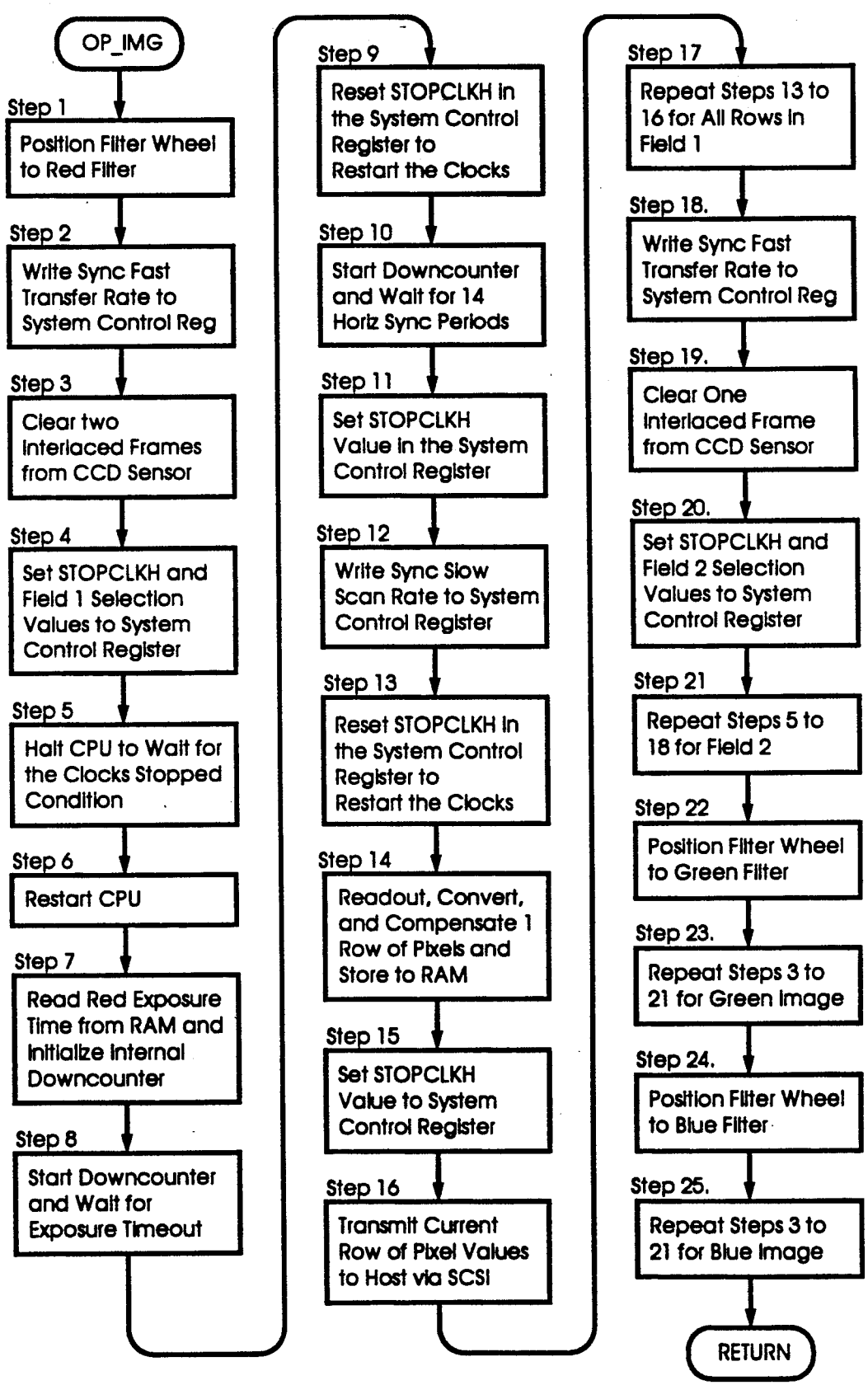

In order to receive an image from the camera, the host computer interrupts CPU 3 via the SCSI BUS to SCSI 9 which signals CPU 3 over interrupt request signal line SIIRQH, as described hereinbefore. CPU 3 then enters the interrupt service routine SCSI_INTH and a byte-by-byte transfer commences with each byte being received by CPU 3 by polling SCSI 9 using chip select signal line SICSL, as described hereinbefore. The first six bytes from the host computer are the SCSI Command Block corresponding to the command Receive Image. CPU 3 decodes this command block and branches to the OP_IMG command service routine stored in ROM 11. A flow chart for the preferred embodiment of said routine is shown in FIG. 9, and consists of 25 steps detailed hereinafter.

Step 1

Position Filter Wheel to Red Filter

The OP_IMG routine first causes CPU 3 to set a 16-bit word in RAM 12 whose value corresponds to the red position of FILTER WHEEL 23 and makes a comparison of said position to the actual position of FILTER WHEEL 23 also stored in RAM 12 as described hereinbefore. If said values coincide, FILTER WHEEL 23 has selected the RED FILTER 24. Otherwise FILTER WHEEL 23 is moved so as to select RED FILTER 24 as described hereinbefore.

Step 2

Write Synchronous Fast Transfer Rate to System Control Register

Next, said OP_IMG routine causes CPU 3 to set a 16-bit word in RAM 12 whose value corresponds to the SYnchronous Fast Transfer rate and copies said value to SYSTEM CONTROL REGISTER 13, as described hereinbefore. Also, as described hereinbefore, SYSTEM CONTROL REGISTER 13 decodes this value and sets logic voltages on signal lines MODE1 and MODE0 at the output thereof in a pattern corresponding to the Synchronous Fast Transfer rate as given in Table 1, causing master clock voltage on signal line MCLKH to oscillate at eight megahertz.

Step 3

Clear Two Interlaced Frames from CCD Sensor

Next, said OP_IMG routine causes two complete image frames from CCD FRAME TRANSFER SENSOR 42 to be cleared for the purpose of removing latent charge packets from the photosensitive portion of FRAME SENSOR 42 designated INTEGRATION REGION 47 in FIG. 2C. Clearing latent charge packets from the photosensitive surface of an image sensor in preparation to exposing said surface to an image is well known to those skilled in the art.

Step 4

Set STOPCLKH and Field 1 Selection Values to System Control Register

Next, said OP_IMG routine causes CPU 3 to prepare the STOP CCD CLOCKS STATE MACH 15 to stop all CCD control signals on the next logic low-to-logic high transition of the signal line designated VSH in FIG. 2B. As described more fully hereinafter, this transition of the voltage on signal line VSH corresponds to the start of Field 1 of the image. CPU 3 writes to the SYSTEM CONTROL REGISTER 13 using chip select signal line SYSCSL, the READ/WRITE CONTROL BUS, and the ADDR/DATA BUS to set system control signal STOPCLKH to a logic value corresponding to a stop clocks request, and to set field select signal FLDSEL to the value corresponding to Field 1. The use of registers by a microprocessor to set conditions is well known to those skilled in the art.

Step 5

Halt CPU to Wait for the Clocks Stopped Condition

In the preferred embodiment, signals STOPCLKH and FLDSEL cause the STOP CCD CLOCKS STATE MACH 15 to stop all CCD control clocks when the condition represented by the aforementioned signals coincide, as shown in the timing diagram given in FIG. 10, and as described hereinafter. Since control by CPU 3 is not needed at this point, it is put in a halt state. Halting the operation of a microprocessor to wait for a condition or event is well known to those skilled in the art.

In addition to inputs designated STOPCLKH, FLDSEL, and VSH, signal lines designated SSL and FI in FIG. 2B are connected to STOP CCD CLOCKS STATE MACH 15 at inputs thereof. Signal VSH is generated by SYNC GENERATOR 14. A logic-low-to-logic-high transition indicates the beginning of an image field. Signal SSL is generated by PIXEL GENERATOR 18, and its logic-high-to-logic-low transition is an indication of the beginning of each row of a field of an image. Signal FI is generated by PULSE PATTERN GENERATOR 16. If this signal is logic high at the logic-low-to-logic-high transition of signal designated VSH, this indicates the beginning of Field 1; if logic low, Field 2.

With CPU 3 halted, the next logic-low-to-logic-high transition of the VSH signal is detected by means of a flipflop internal to STOP CCD CLOCKS STATE MACH 15. The use of flipflops to detect a logic-low-to-logic-high transition of a given signal is well known to those skilled in the art. If the signal FI is logic low during the logic-low-logic-high transition of the VSH signal, and the beginning of Field 2 is indicated; no action is taken. When said flipflop is clocked while the signal FI is high, the beginning of Field 1 is detected. The next logic-high-to-logic-low transition of signal SSL will cause STOP CCD CLOCKS STATE MACH 15 to assert output signal CSTOPH.

Step 6

Restart CPU

When CSTOPH is asserted, logic gate 8 will stop signal PCLKH in the logic low state, and logic gate 7 will stop signal SCLKL in the logic high state. At this point, therefore, all control signals to CCD FRAME TRANSFER SENSOR 42 are stopped at the start of Field 1, as indicated by the notation in FIG. 10, "STOP CLOCKS FOR FIELD 1 EXPOSURE." Signal CSTOPH also interrupts CPU 3 so that CPU 3 restarts at the point at which it was halted. The interrupt to CPU 3 is then be cleared and execution of the OP_IMG command service routine continues. The use of interrupts to restart halted microprocessors is well known to those skilled in the art.

Since the time required to respond to the CSTOPH interrupt (known to those skilled in the art as interrupt latency) and to restart the execution of software program OP_IMG is invariant, and since both CPU 3 and all signals to CCD FRAME TRANSFER SENSOR 42 are fundamentally synchronized to common clock 16 MHZ OSC 2, CPU 3 will always be restarted at exactly the same point in time relative to the start of Field 1. The use of a common clock by multiple systems to ensure synchronous response to an event is well known to those skilled in the art.

Step 7

Read Red Exposure Time from RAM and Initialize Internal Downcounter

Next, CPU 3 continues execution of said OP_IMG routine by reading from RAM 12 the exposure time value corresponding to the number of milliseconds required to expose the red image. This is done by asserting chip select signal LCSL, and by using the READ/- WRITE CONTROL BUS, the ADDR BUS, and the ADDR/DATA BUS to write this value in an internal register of CPU 3. Storage of exposure time values in RAM 12 has been described hereinbefore and transferring a value from RAM 12 to an internal register of a microprocessor is well known to those skilled in the art.

Step 8

Start Downcounter and Wait for Exposure Timeout

As is well known to those skilled in the art, the Intel 80C188 microprocessor (CPU 3) contains an internal timer. This timer is set to count in intervals of 1 millisecond and is used to downcount the exposure time value from the initial count until a count of 0 is detected. At this point, the exposure required for the red image is complete. The use of internal timers/counters for interval timing by downcounting by a microprocessor is well known to those skilled in the art.

As described hereinbefore the electronic representation of an image stored on the photosensitive surface (integration region) of a CCD Frame Transfer Sensor is composed of packets of charge generated by integrating incident light during an exposure time and with said packets of charge resident in a planar array of photosensitive elements. Said photosensitive elements correspond to the least resolvable elements of the image. Said least resolvable elements of an image were referred to hereinbefore as pixels. The charge packet associated with each pixel was referred to hereinbefore as the pixel value and may be a non-linear function of the light energy integrated during an exposure time. Therefore the amount of charge associated with each charge packet in each pixel is referred to as an uncompensated pixel value.

The pixels of INTEGRATION REGION 47 are divided into two fields, hereinbefore called Field 1 and Field 2, comprised of odd and even lines of the image, respectively. As is well known to those skilled in the art, the interlacing of Field 1 with Field 2 produces what is known in the art as a "frame".

Charge packets representing Field 1 of the red image are transferred from INTEGRATION REGION 47 into the region designated STORAGE REGION 48 in FIG. 2C as described hereinafter. It should be understood that there is a one-to-one correspondence between the charge storage elements of INTEGRATION REGION 47 and those of STORAGE REGION 48. However, charge storage elements of STORAGE REGION 48 are shielded from light passing through RED FILTER 24 to CCD FRAME TRANSFER SENSOR 42 in order to prevent further integration of light.

Step 9

Reset STOPCLKH in the System Control Register to Restart the Clocks

In order to perform the required transfer of Field 1 of the red image from INTEGRATION REGION 47 to STORAGE REGION 48, routine OP_IMG causes CPU 3 to reset the clock control signal STOPCLKH in SYSTEM CONTROL REGISTER 13 in a manner similar to setting STOPCLKH, described hereinbefore. Therefore, clock control signals PCLKH and SCLKL begin operating once again at the Synchronous Fast Transfer rate. SYNC GENERATOR 14 resumes its output signals, namely, clock control signals HSH, VSH, CS, and CB. PULSE PATTERN GENERA- TOR 16 resumes its output signals, namely, those on the bus designated PCH, the VERTICAL DRIVE BUS, and signal lines PSSH and FI. PIXEL GENERATOR 18 resumes its output signals, namely those on the HORIZONTAL DRIVE BUS and signal lines SHENL and SSL. These clock control signals in combination cause the charge packets corresponding to Field 1 to be transfered from INTEGRATION REGION 47 to STORAGE REGION 48 of CCD FRAME TRANSFER SENSOR (Philips NXA1031), as is well known to those skilled in the art. This takes place during the interval marked "FIELD 1 TRANSPORT TO STORAGE" in FIG. 10, as described hereinafter.

Step 10

Start Downcounter and Wait for 14 Horizontal Sync Periods

At the beginning of the transfer interval routine OP_IMG causes CPU 3 to store the decimal number 15 in one of its internal registers. The circuit designated SYNC STATUS BUFFER 17 in FIG. 2B causes the current value of the input signal HSH to appear on the ADDR/DATA BUS for access by CPU the input signal HSH to appear on the ADDR/DATA BUS for access by CPU 3. The OP_IMG routine next causes CPU 3 to begin polling the SYNC STATUS BUFFER 17 by means of chip select signal line STATCSL, the READ/WRITE CONTROL BUS, and the ADDR/DATA BUS. The use of status buffer polling by a microprocessor to sense a given signal or condition is well known to those skilled in the art.

When CPU 3 reads from the ADDR/DATA BUS during the current poll cycle a logic low value corresponding to the horizontal sync signal HSH, followed by a logic high value on the next poll cycle, a logic-low-to-logic-high transition of the HSH signal has been detected. The use of status buffer polling to detect both logic-low-to-logic-high and logic-high-to-logic-low transitions of a signal or condition is well known to those skilled in the art.

For each logic-low-to-logic-high transition of the HSH signal, CPU 3 causes the value of the number stored in the internal register described hereinbefore to be decremented by 1. When the contents of this internal register becomes 0, 15 logic-low-to-logic-high transitions of the HSH signal have occurred. Decrementing the value of the contents of an internal register for the purpose of downcounting has been described hereinbefore. As is well known to those skilled in the art, at this point all charge packets corresponding to Field 1 of the red image have been transfered to STORAGE REGION 48.

Steps 11-12

Set STOPCLKH Value in the System Control Register; Write Synchronous Slow Scan Rate to System Control Register; Respectively Next, in the preferred embodiment routine OP_IMG causes CPU 3 to set the STOPCLKH signal in SYSTEM CONTROL REGISTER 13, in the manner described hereinbefore. This causes clock control signals SCLKL and PCLKH to stop and CPU 3 to be interrupted, as described hereinbefore. At this point, routine OP_IMG causes CPU 3 to set MULTIMODE CLOCKS MUX 5 to set the scan rate to the Synchronous Slow Scan rate, as described hereinbefore and as listed in Table 1; this event is labeled as "CHANGE TO SLOW SCAN FOR ADC" in FIG. 10.

Steps 13-14

Reset STOPCLKH in the System Control Register to Restart the Clocks; Readout, Convert, and Compensate 1 Row of Pixels and Store to RAM; Respectively Next, the readout and analog-to-digital conversion of Field 1 of the red image takes place, as described hereinafter. First, routine OP_IMG causes CPU 3 to reset signal STOPCLKH in SYSTEM CONTROL REGISTER 13, in the manner described hereinbefore, thereby restarting all timing signals at the Synchronous Slow Scan rate. This causes HORIZONTAL SHIFT REGISTERS 49-51 to provide uncompensated analog pixel voltages on three outputs thereof on signal lines SVID1, SVID2, and SVID3 of CCD FRAME TRANSFER SENSOR 42. Analog voltages which appear on the outputs of these signal lines are proportional to the uncompensated pixel values of row 16 of Field 1 of the red image. As is well known to those skilled in the art, signals on signal lines SVID1, SVID2, and SVID3, of CCD FRAME TRANSFER SENSOR 42 (Philips NXA1031) correspond to every third pixel column in the image with each having a 50% duty cycle.

Signal lines SVID1, SVID2, and SVID3 are connected to PREAMPS 37-39, as described hereinbefore. Accordingly, PREAMPS 37-39, provide amplified analog uncompensated pixel voltages via signal lines PRVID1, PRVID2, and PRVID3, respectively. The use of preamplifiers to amplify the outputs of CCD frame transfer sensors is well known to those skilled in the art.

Signal lines PRVID1, PRVID2, and PRVID3 are connected to BLC 34-36, as described hereinbefore. Additionally, BLC CONTROL 33 is connected to BLC 34-36 at inputs SH1L, SH2L, and SH3L thereof, as described hereinbefore. BLC CONTROL 33 is connected to the CCD TIMING BUS which supplies the signal SHENL generated by PIXEL GENERATOR 18 and signal PCLKH generated by logic gate 8. As shown in the timing diagram given in FIG. 11, the coincidence of signals SHENL and PCLKH cause BLC CONTROL 33 to provide a single active low logic pulse on signal line SH1L, labeled "BLACK LEVEL CLAMP CHANNEL 1" in FIG. 11. This causes BLC 36 to sample the analog uncompensated pixel voltage on signal line PRVID1. As is well known to those skilled in the art, during the interval labeled "BLACK LEVEL CLAMP CHANNEL 1", CCD FRAME TRANSFER SENSOR 42 (Philips NXA1031) causes the voltage value on SVID1 to represent the value of a black (non-illuminated) pixel. BLC 36 samples and holds this voltage as a black level reference against which all other analog uncompensated pixel voltages of row 16 of Field 1 of the red image are compared. Black pixel voltages on PRVID2 and PRVID3 are similarly clamped and held as references by BLC 34 and BLC 35, respectively, during the intervals labeled "BLACK LEVEL CLAMP CHANNEL 2" and "BLACK LEVEL CLAMP CHANNEL 3", respectively. The use of black level clamps to sample and hold black voltages and use said voltages as black level reference voltages is well known to those skilled in the art.

The outputs of BLCs 36-34 are connected to SLOW SCAN MUX 32 at first, second, and third signal inputs thereof via signal lines PAVID1, PAVID2, and PA- VID3, respectively. Additionally IMAGE READOUT CONTROL 27 is connected to said SLOW SCAN MUX 32 via the SLOW SCAN MUX CONTROL BUS which provides signals VMUX1H and VMUX0H at inputs thereof, as described hereinbefore. IMAGE READOUT CONTROL 27 is connected to the HORIZONTAL DRIVE BUS wherein signal designation CL, generated by PIXEL GENERATOR 18, represents signal lines C1L, C2L, and C3L, the timing for said signal lines shown in FIG. 11. Additionally, IMAGE READOUT CONTROL 27 is connected to the CCD TIMING BUS which provides signal SSL generated by PIXEL GENERATOR 16, and to the CLOCK MODE BUS which provides signals MODE1 and MODE0 generated by SYSTEM CONTROL REGISTER 13 at inputs thereof. It should be understood that signals MODE1 and MODE0 indicate to IMAGE READOUT CONTROL 27 that the camera is operating at the Synchronous Slow Scan rate, as shown hereinbefore in Table 1.

Figure 11:
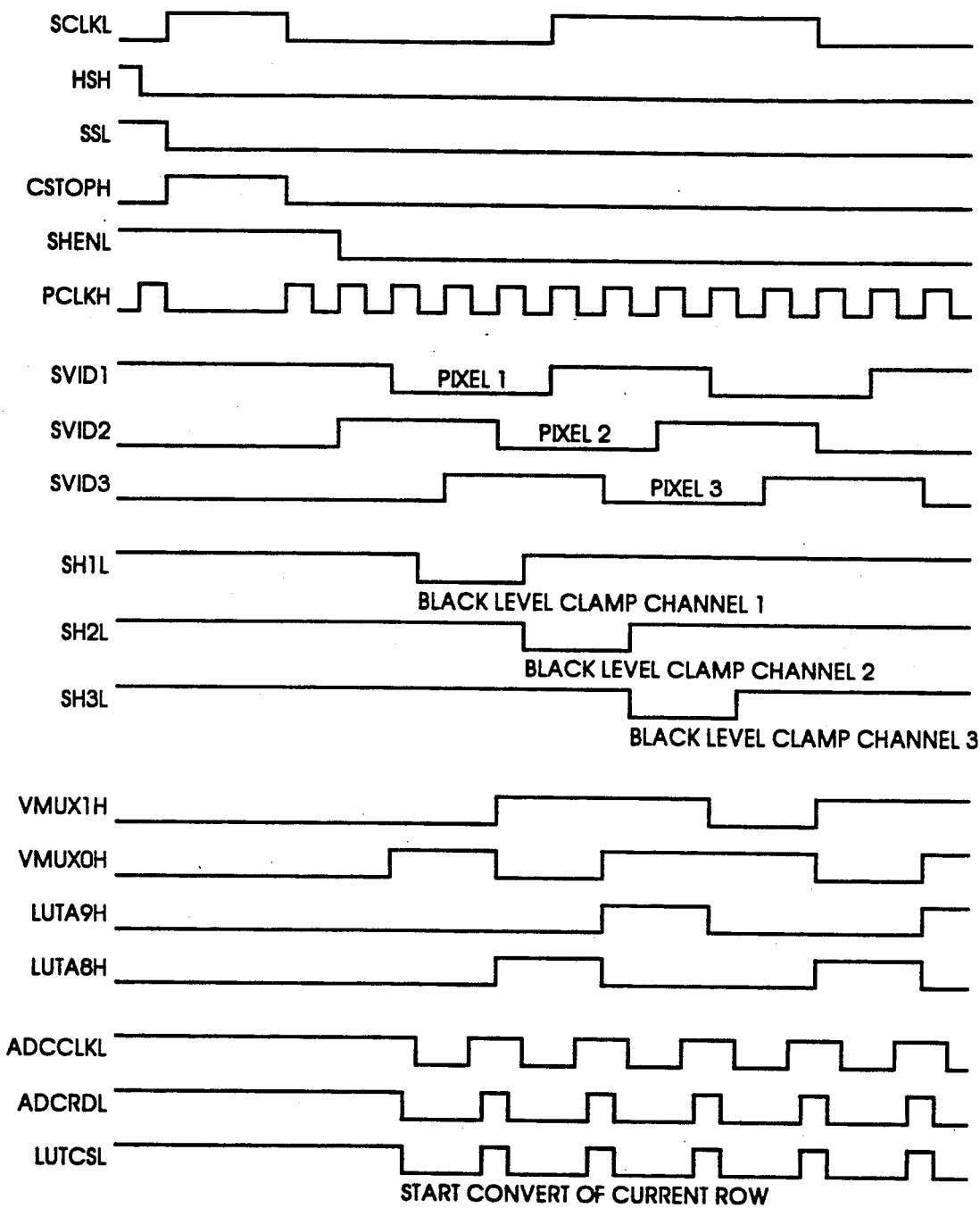

With reference to FIG. 11, signals VMUX1H and VMUX0H are held logic low during the interval in which signal SSL is logic low. When signal SSL is logic high, signals C1L, C2L, and C3L cause IMAGE READOUT CONTROL 27 to generate VMUX1H and VMUX0H in a sequence which causes SLOW SCAN MUX 32 to provide the properly interleaved sequence of clamped, black reference, amplified, uncompensated analog pixel voltages corresponding to sequence of uncompensated pixel values from row 16 of Field 1 of the red image. Said sequence of analog voltages all appear on signal line MVID connected to POST-STAMP 90 at the input thereof, with the output thereof, designated signal SVID, further connected to the analog input of 8-BIT ADC 30.

Additionally, the signal line designated ADCCLKL in FIG. 2A is generated by IMAGE READOUT CONTROL 27, and is connected to 8-BIT ADC 30 at the convert clock input thereof, thereby providing 8-BIT ADC with synchronous convert clock pulses whose purpose is to ensure synchronous sampling of the outputs of CCD FRAME TRANSFER SENSOR 42, thus preventing pixel jitter. Furthermore, 8-BIT ADC 30 is connected to the MEMORY SELECT BUS that provides chip select signal ADCRDL. The timing of signals ADCCLKL and ADCRDL are shown in FIG. 11. In the preferred embodiment of the invention, 8-BIT ADC 30 is an 8-bit ADC marketed by Micro Power Systems under the trade designation MP7683. It requires a logic-high-to-logic-low transition on its convert clock input (signal ADCCLKL) followed by a logic-low-to-logic-high transition on its output enable input (signal ADCRDL) in order to ensure the proper digitization of each value of each uncompensated pixel voltage at the output on the IMAGE DATA BUS. The use of ADC converters is well known to those skilled in the art.

During the interval labeled "START CONVERT OF CURRENT ROW" in FIG. 11, routine OP_IMG causes CPU 3 to store in RAM 12 compensated digital pixel values corresponding to uncompensated digital pixel values generated by 8-BIT ADC 30 of row 16 of Field 1 of the red image. This is accomplished when 8-BIT ADC 30 generates via the IMAGE DATA BUS the lower eight bits of the 10-bit address required by COMP RAM 28. Additionally, IMAGE READOUT CONTROL 27 generates via the LUT ADDR BUS the upper two bits (signals LUTA8H and LUTA9H) of the 10-bit address required by COMP RAM 28, as well as the output enable signal designated LUTCSL in FIG. 2A. The timing of signals LUTA8H, LUTA9H, and LUTCSL is shown in FIG. 11. It should to be understood that the pixel labeled "PIXEL 1" in FIG. 11 corresponds to the output of HORIZONTAL SHIFT REGISTER 49; "PIXEL 2" to the output of HORIZONTAL SHIFT REGISTER 50; and "PIXEL 3" to the output of HORIZONTAL SHIFT REGISTER 51. Therefore, signals LUTA8H and LUTA9H, as shown in FIG. 11, cause the proper selection of each 256-byte section of the 768-byte table stored in COMP RAM 28 corresponding to each of the three output channels of CCD FRAME TRANSFER SENSOR 42. When chip select signal LUTCSL is asserted, CPU 3 reads the 8-bit compensated pixel value from the output of COMP RAM 28 via the ADDR/DATA BUS, and stores it as one byte in RAM 12. Transfers by CPU 3 of data from peripherals to RAM 12 have been described hereinbefore.

Steps 15-16

Set STOPCLKH Value to System Control Register; Transmit Current Row of Pixel Values to Host via SCSI; Respectively During the interval labeled "ROW 16 ADC" in FIG. 10, CPU 3 has been downcounting an internal register whose contents was initialized to the number of pixels in a horizontal row of an image. Downcounting by CPU 3 has been described hereinbefore. When the value of the internal register reaches 0, CPU 3 sets the STOPCLKH value in SYSTEM CONTROL REGISTER 13, which in turn causes CSTOPH to be asserted in order to stop all CCD control clocks, in the manner described hereinbefore. Next, routine OP_IMG causes CPU 3 to access SCSI 9 and transmit the compensated pixel values corresponding to row 16 of Field 1 of the red image from RAM 12 over SCSI BUS to the host computer during the intervals labeled "STOP FOR SCSI XMIT ROW 16" and "ROW 16 SCSI DATA TO HOST" in FIG. 10. Since the host computer issued the OP_IMG command to the camera, it is ready to receive data using the SCSI DMA (Direct Memory Access) protocol. Digital data transmission to host computers by means of SCSI DMA protocol is well known to those skilled in the art.

Also, as well known to those skilled in the art, the Intel 80C188 microprocessor (CPU 3) contains an internal DMA unit. Therefore, routine OP_IMG causes CPU 3 to initialize its internal DMA unit with a count corresponding to the number of compensated pixel values (bytes) for one row of the image. These are then transmitted from RAM 12 to the host computer. When the internal DMA unit has completed the transmission, routine OP_IMG causes CPU 3 to restart the CCD control clocks by resetting CSTOPH, as described hereinbefore. Next, all compensated pixels values of all the remaining rows of Field 1 of the red image are digitized and transmitted to the host in an identical manner, as described hereinbefore, one row at a time.

Step 17

Repeat Steps 13 to 16 for All Rows in Field 1

During the interval for the digitization of Field 1, CPU 3 has been downcounting an internal register whose contents was initialized to the number of rows in Field 1 of the image. Downcounting by CPU 3 has been described hereinbefore. When the value of the internal register reaches 0, all compensated pixels values for Field 1 of the red image have been transmitted to the host.

Steps 18-20

Write Synchronous Fast Transfer Rate to System Control Register; Clear One Interlaced Frame from CCD Sensor; Set STOPCLKH and Field 2 Selection Values to System Control Register; Repeat Steps 5 to 18 for Field 2; Respectively

Next, routine OP_IMG causes CPU 3 to clear one complete field from CCD FRAME TRANSFER SENSOR 42 at the Synchronous Fast Transfer rate, as described hereinbefore, to prepare for the exposure of Field 2 of the red image. Next, as shown in the flow chart of FIG. 9, routine OP_IMG causes CPU 3 to stop the CCD control clocks at the beginning of Field 2 of the red image, and, using the red image exposure value, causes the exposure of Field 2 of the red image for the red exposure time, as described hereinbefore for exposing Field 1 of the red image. Next, routine OP_IMG causes CPU 3 to start the CCD control clocks at the Synchronous Fast Transfer rate to transfer the charge packets corresponding to Field 2 of the red image from INTEGRATION REGION 47 to STORAGE REGION 48, as described hereinbefore for Field 1 of the red image. Next, routine OP_IMG causes CPU 3 to skip the first 15 rows of Field 2 of the red image at the Synchronous Fast Transfer rate, and then digitize and transmit the compensated pixel values to the host at the Synchronous Slow Scan rate, as described hereinbefore for Field 1 of the red image.

Steps 22-25

Position Filter Wheel to Green Filter; Repeat Steps 3 to 21 for Green Image; Position Filter Wheel to Blue Filter; Repeat Steps 3 to 21 for Blue Image; Respectively

Thereafter, routine OP_IMG causes CPU 3 to cause rotation of FILTER WHEEL 23 to the GREEN FILTER 25 position and to repeat steps 5 to 18 in FIG. 9 for Fields 1 and 2 of the green image. In an identical manner, routine OP_IMG causes CPU 3 to cause rotation of FILTER WHEEL 23 to the BLUE FILTER 26 position and to repeat steps 5 to 18 in FIG. 9 for Fields 1 and 2 of the blue image. Once transfer of the digitized multicolor image has been completed, routine OP_IMG cause CPU 3 to return to routine SH_EXIT stored in ROM 11, which returns the SCSI status to the host computer, clears the SCSI interrupt, and returns the camera to the Synchronous Fast Transfer rate as described hereinbefore. CPU 3 resumes operation in the endless loop, as described hereinbefore. At this point the digital signal representation of the images generated by the preferred embodiment at the three primary colors are resident in the host computer and may be combined by the host computer to display a compensated, jitter-free (undistorted), multicolor image on a cathode ray tube in a manner will know to those skilled in the art.

OTHER EMBODIMENTS OF THE INVENTION

While the invention has been particularly shown and described with respect to a preferred embodiment employing a computer controlled CCD frame transfer sensor, it will be understood by those skilled in the art that changes in form and detail may be made therein without departing from the spirit and scope of the invention.

As is well known to those skilled in the art, the output of a CCD frame transfer sensor is generated by transferring packets of charge. Due to non-uniformities in a device of this type, charge transfer may be inaccurate, producing errors in the pixel values generated which cannot be compensated by means of a compensation table. Therefore, another embodiment of the invention would employ as an image sensor an X,Y array of photosensitive elements wherein each charge packet may be read out directly under computer control, as is well known to those skilled in the art, by an X,Y addressing means. Still further embodiments of the invention would employ as an image sensor a television tube, such as a Nuvicon, Vidicon, or Orthicon, operating under computer control, wherein the charge pattern corresponding to the image is readout by an electron beam positioned by digitally generated horizontal and vertical drive circuits, in order to prevent pixel jitter. Exposure control would be provided by blanking the electron beam during the exposure time and eliminating incident light during readout and digitization of the pixel values by means of a mechanical shutter.

Also, it will be understood by those skilled in the art that the wavelength of incident light used to produce the multicolor image need not be limited to the three primary visible colors, but could cover a multiplicity of wavelengths selected as desired over the spectral band over which the image sensor responds.

Further, it will be understood by those skilled in the art that the stored software programs described with respect to the preferred embodiment need not be limited to those for storing exposure values, loading compensation tables, setting a scan rate, receiving an image, or positioning a filter wheel. The internal microprocessor of the computerized multicolor camera disclosed herein may have general purpose capabilities. Therefore, stored programs could also include those for permitting a host computer to examine the stored values of a compensation table or tables, exposure times, and other parameters; for permitting a host computer to receive digital values of selected portions or field of an image rather than values of a full frame; for permitting a host computer to activate diagnostic software programs for the purpose of calibrating the performance and/or response of the camera; and for permitting a host computer to cause execution by the internal microprocessor of a multiplicity of other functions obvious to those skilled in the art.

Finally, it will be understood by those skilled in the art that, although the preferred embodiment assumed that the connection to the host computer was the SCSI connection, other embodiments of the invention could employ other standard connections such as GPIB, RS232, etc.

We claim:

1. A camera apparatus for providing multiple digital signal representations of multiple monocolor images of an object comprising, in combination:

color selection means within said camera apparatus for sequentially selecting multiple colors from said object;

electronic scanning means within said camera apparatus for scanning an entire monocolor image of said object in one scanning operation in an x and y direction and for generating analog electronic signals from said scanning operation, the color of said monocolor image of said object being determined by said color selection means, said electronic scanning means performing said scanning operation for each of said multiple monocolor images when said color selection means selects each of said multiple colors;

conversion means within said camera apparatus for converting said analog electronic signals into said multiple digital signal representations of said multiple monocolor images of said object;

multiple output means within said camera apparatus coupled to said conversion means for providing both real-time and slow scan video outputs from said conversion means; and computer means within said camera apparatus for controlling said color selection means, said electronic scanning means, and said conversion means and for transmitting said multiple digital signal representations over a computer network interface.

2. The apparatus for providing multiple digital signal representations of multiple monocolor images of an object according to claim 1, additionally comprising means for storing said multiple digital signal representations of said multiple monocolor images of said object.

3. The apparatus for providing multiple digital signal representations of multiple monocolor images of an object according to claim 1 additionally comprising timing means independent of said computer means for generating real-time monocolor video which is asynchronous to said computer means.

4. The apparatus for providing multiple digital signal representations of multiple monocolor images of an object according to claim 3 wherein said timing means comprises a video asynchronous oscillator.

5. The apparatus for providing multiple digital signal representations of multiple monocolor images of an object according to claim 1 additionally comprising means for selecting multiple exposure times corresponding to said multiple colors under the control of said computer means.

6. The apparatus for providing multiple digital signal representations of multiple monocolor images of an object according to claim 1 wherein said color selection means comprises color filter mechanism means for alternatively filtering said multiple colors from said object under control of said computer means.

7. The apparatus for providing multiple digital signal representations of multiple monocolor images of an object according to claim 1 wherein said electronic scanning means comprises synchronous timing means for providing timing signals precisely in synchronism with a clock of said computer means.

8. The apparatus for providing multiple digital signal representations of multiple monocolor images of an object according to claim 7 wherein said timing signals precisely define the spatial location of each one of a multiplicity of pixels in said digital signal representations of said multiple color images.

9. The apparatus for providing multiple digital signal representations of multiple monocolor images of an object according to claim 1 wherein said conversion means comprise analog-to-digital converter means for providing said multiple digital signal representations from said analog electronic signals.

10. The apparatus for providing multiple digital signal representations of multiple monocolor images of an object according to claim 1 wherein said analog electronic signals are coupled to black level clamp means for providing a differential analog electronic signal corresponding to a black reference level signal.

11. The apparatus for providing multiple digital signal representations of multiple monocolor images of an object according to claim 1 additionally comprising compensation means for compensating for a photometric nonlinearity of said electronic scanning means.

12. The apparatus for providing multiple digital signal representations of multiple monocolor images of an object according to claim 11 wherein said compensation means comprises table means for storing digital compensation values, having an input coupled to an output of said conversion means which generates uncompensated pixel values, and having an output providing compensated pixel values which comprise said multiple digital signal representations.

13. The apparatus for providing multiple digital signal representations of multiple monocolor images of an object according to claim 1 wherein said computer network interface comprises a Small Computer Systems Interface (SCSI).

14. The apparatus for providing multiple digital signal representations of multiple monocolor images of an object according to claim 1 wherein said electronic scanning means comprises an array of photosensitive elements each of which corresponds to a pixel of one of said monocolor images of said object.

15. The apparatus for providing multiple digital signal representations of multiple monocolor images of an object according to claim 14 wherein said array of photosensitive elements is a light integration region of a Charge Coupled Device (CCD) frame transfer sensor.

16. The apparatus for providing multiple digital signal representations of multiple monocolor images of an object according to claim 15 wherein said CCD frame transfer sensor additionally comprises a storage region having elements in one-to-one correspondence to each one of said array of photosensitive elements of said light integration region.

17. The apparatus for providing multiple digital signal representations of multiple monocolor images of an object according to claim 1 wherein said electronic scanning means comprises means for providing synchronous timing signals at a Synchronous Fast Transfer Rate for causing transfer of said images from a light integration region to a storage region and for providing synchronous timing signals at a Synchronous Slow Scan Rate for providing said analog electronic signals to said conversion means for storage and transmission, and means for providing exposure intervals corresponding to each of said multiple monocolor images during which no timing signals are present so as to permit photometric integration of light from each one of said multiple monocolor images.

* * * * *